(12) United States Patent
Qiu et al.

(10) Patent No.: US 12,436,152 B2
(45) Date of Patent: Oct. 7, 2025

(54) METHODS FOR PREDICTING AND MODULATING GLYCATION OF A PROTEIN

(71) Applicant: Regeneron Pharmaceuticals, Inc., Tarrytown, NY (US)

(72) Inventors: Haibo Qiu, Millwood, NY (US); Xiaobin Xu, Old Greenwich, CT (US); Douglas Kamen, Poughquag, NY (US); Teng-Chieh Yang, Stratford, CT (US); Kenneth Graham, Pleasant Valley, NY (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 860 days.

(21) Appl. No.: 17/711,817

(22) Filed: Apr. 1, 2022

(65) Prior Publication Data

US 2022/0326250 A1    Oct. 13, 2022

Related U.S. Application Data

(60) Provisional application No. 63/170,330, filed on Apr. 2, 2021.

(51) Int. Cl.
*G01N 33/68* (2006.01)
*A61K 39/00* (2006.01)
*C07K 16/28* (2006.01)

(52) U.S. Cl.
CPC ......... *G01N 33/6803* (2013.01); *C07K 16/28* (2013.01); *A61K 2039/505* (2013.01); *A61K 2039/545* (2013.01); *C07K 2317/24* (2013.01); *C07K 2317/52* (2013.01); *C07K 2317/565* (2013.01); *C07K 2317/92* (2013.01); *C07K 2317/94* (2013.01)

(58) Field of Classification Search
CPC .................................................. G01N 33/6803
See application file for complete search history.

(56) References Cited

U.S. PATENT DOCUMENTS

| 2012/0129147 A1 | 5/2012 | Das et al. | |
| 2021/0062156 A1* | 3/2021 | Crowell | ............... C12N 5/0682 |

OTHER PUBLICATIONS

U.S. Appl. No. 63/170,330, filed Apr. 2, 2021, Expired.
(Continued)

*Primary Examiner* — Kathryn Elizabeth Limbaugh
(74) *Attorney, Agent, or Firm* — Schwabe, Williamson & Wyatt PC; David Mellman

(57) ABSTRACT

Embodiments provide for methods of predicting glycation percentage of an amino acid in a therapeutic biomolecule. In one example, a method of predicting a glycation percentage of an amino acid in a biomolecule includes determining a first set of rates for a de-glycation reaction for a first set of temperatures, inferring a second set of one or more rate(s) for the de-glycation reaction for a second set of temperatures, and using the second set of one or more rate(s) to predict the glycation percentage at any temperature corresponding to the second set of temperatures and over any time duration. Also provided are methods for maintaining a glycation percentage of an amino acid within a predetermined glycation percentage range over a shelf-life of a therapeutic biomolecule, and methods for either reducing or increasing a potency of a therapeutic biomolecule in a subject at a time of administration.

10 Claims, 16 Drawing Sheets

Specification includes a Sequence Listing.

(56) References Cited

OTHER PUBLICATIONS

PCT/US2022/023127, Apr. 1, 2022, WO 2022/212889, Published.

Mo Jingjie et al: "Quantitative analysis of glycation and its impact on antigen binding", MABS, vol. 10, No. 3, Mar. 5, 2018 (Mar. 5, 2018), pp. 406-415, XP055938307, ISSN: 1942-0862, DOI: 10.1080/19420862.2018.1438796.

Rabbani Naila et al: "Mass spectrometric determination of early and advanced glycation in biology", Glycoconjugate Journal, Chapman & Hall, Boston, vol. 33, No. 4, Jul. 20, 2016 (Jul. 20, 2016), pp. 553-568, XP036024133, ISSN: 0282-0080, DOI: 10.1007/810719-016-9709-8 [retrieved on Jul. 20, 2016].

Watkins et al., "Glycation of Amino Groups in Protein," Journal of Biological Chemistry vol. 260 (No. 19):10629-10636, (1985).

Wei Bingchuan et al.: "Glycation of antibodies: Modification, methods and potential effects on biological functions", MABS, vol. 9, No. 4, Jan. 1, 2017 (Jan. 1, 2017), pp. 586-594, XP055912445.

WIPO Application No. PCT/US2022/023127, PCT International Search Report and Written Opinion of the International Searching Authority mailed Sep. 8, 2022.

WIPO Application No. PCT/US2022/023127, PCT Invitation to Pay Additional Fees and, Where Applicable, Protest Fee Report mailed Jul. 15, 2022.

Xu Xiaobin et al., "Low pKa of Lys promotes glycation at one complementarity-determining region of a bispecific antibody", Biophysical Journal, Elsevier, Amsterdam, NL, vol. 121, No. 6, Mar. 15, 2022 (Mar. 15, 2022), pp. [1081-1093, XP086994614, ISSN: 0006-3495, DOI: 10.1016/J.BPJ.2022.02.002 [retrieved on Feb. 2, 2022].

* cited by examiner

SEQUENCE LISTING

```
<160> NUMBER OF SEQ ID NOS: 2

<210> SEQ ID NO 1
<211> LENGTH: 13
<212> TYPE: PRT
<213> ORGANISM: Artificial Sequence
<220> FEATURE:
<223> OTHER INFORMATION: Synthetic

<400> SEQUENCE: 1

Ala Glu Asp Thr Ala Val Tyr Phe Cys Val Lys Asp Arg
1               5                   10

<210> SEQ ID NO 2
<211> LENGTH: 11
<212> TYPE: PRT
<213> ORGANISM: Artificial Sequence
<220> FEATURE:
<223> OTHER INFORMATION: Synthetic

<400> SEQUENCE: 2

Ala Glu Asp Thr Ala Val Tyr Phe Cys Val Lys
1               5                   10
```

METHODS FOR PREDICTING AND MODULATING GLYCATION OF A PROTEIN

CROSS-REFERENCE TO RELATED APPLICATION

This application claims the benefit under 35 USC § 119(e) of U.S. Provisional Application No. 63/170,330, filed Apr. 2, 2021, which is incorporated herein by reference in its entirety for all purposes.

REFERENCE TO A SEQUENCE LISTING

This application incorporates by reference the Sequence Listing submitted in Computer Readable Form as file 10862US01-Sequence.txt, created on Apr. 1, 2022 and containing 681 bytes.

FIELD OF THE INVENTION

The present invention relates to therapeutic biomolecules, and in particular to methods of determining and/or predicting glycation levels and potency of therapeutic biomolecules in vitro and in vivo.

BACKGROUND

Protein glycation, the non-enzymatic reaction of a reducing sugar with an amine group of an amino acid, is a common postranslational modification in biomolecules, for example therapeutic biomolecules such as monoclonal antibodies (mAbs). When glycation occurs in a region of a therapeutic biomolecule that is important for its function, for example on the complementarity determining region (CDR) of a therapeutic mAb, potency and biological activity may be compromised. Biomolecules with susceptible amine groups can undergo the process of glycation (or de-glycation) both in vivo and in vitro.

For example, all monoclonal antibodies currently approved by the U.S. Food and Drug Administration (FDA) are produced from mammalian cell culture. During the cell culture process, mAbs are secreted into the culture medium, where glucose is present as an energy source. Since the cell culture environment is similar to physiological conditions, it is likely that most mAbs are glycated to at least some extent. Formulation, packaging, and storage follow mAb purification, where glycation of mAbs may potentially proceed further or reverse depending on particular processes and conditions. The mechanisms and extent of glycation are unpredictable as a result of the complexity of the mAb production process, and analysis of amino acid sequences or structural motifs currently cannot provide reliable prediction of glycation hotspots. Furthermore, at present there is no framework to enable a prediction of the extent of mAb glycation and/or de-glycation which can occur under storage conditions and/or following administration to a subject in need thereof. As glycation of therapeutic biomolecules, such as mAbs, can impact the potency of such biomolecules, there is currently a need for methodology that can reliably determine and/or predict glycation and de-glycation of therapeutic biomolecules both in vitro (e.g., under storage conditions) and in vivo (e.g., following administration to a subject in need).

BRIEF SUMMARY OF THE INVENTION

In one aspect, the present invention provides a method of predicting a glycation percentage of an amino acid in a biomolecule, comprising: determining a first set of de-glycation rates for a first temperature set over a first time duration; inferring a second set of one or more de-glycation rates for a second temperature set based on the first set of de-glycation rates; and using the second set of one or more de-glycation rate(s) to predict the glycation percentage at any temperature corresponding to the second temperature set and over a duration encompassed by a second predetermined time frame.

In embodiments, the first temperature set comprises temperatures that are higher than those of the second temperature set. For example, the first temperature sent may include temperatures ranging from 20–45° C., and the second temperature set may include temperatures ranging from 2–8° C. In some examples, the second temperature set corresponds to a temperature of 5° C.

In some embodiments, the first predetermined time frame is less than 40 days.

In some embodiments the second predetermined time frame is at least three months. For example, the second predetermined time frame may be 6 months, or 9 months, or 12 months, or even greater than 12 months, such as 18 months, or 24, or 36 months.

In embodiments, determining the first set of de-glycation rates for the first temperature set over the first time duration includes measuring a percentage of glycation of the amino acid for each temperature included in the first temperature set, as a function of time corresponding to at least a portion of the first time duration, and performing a data-fitting procedure to obtain the first set of de-glycation rates.

In embodiments, the method includes determining the first set of de-glycation rates as a function of two or more different pH values. In some examples, for each of the two or more different pH values, the method further includes determining an activation energy associated with de-glycation of the amino acid based on the first set of de-glycation rates. In some examples, the method further includes inferring the second set of de-glycation rates as a function of at least one of the two or more different pH values, and using the second set of one or more de-glycation rates to predict the glycation percentage at any temperature corresponding to the second temperature set and over any duration encompassed by the second predetermined time frame as a function of at least one of the two or more different pH values.

In some embodiments, the method further includes determining the first set of de-glycation rates in an absence of glucose, wherein the amino acid of the biomolecule is glycated to a predetermined first percentage. In examples, predicting the glycation percentage is based on the second set of one or more de-glycation rates, the predetermined first percentage to which the amino acid of the biomolecule is glycated, and a difference between the predetermined first percentage and 0% glycation.

In one aspect, the present invention provides a method for maintaining a glycation percentage of an amino acid in a biomolecule within a predetermined glycation percentage range over a shelf-life of the biomolecule. The method comprises incubating the biomolecule having a first glycation percentage in a plurality of different glucose concentrations, and measuring the glycation percentage over time for each of the plurality of different glucose concentrations; determining a glycation equilibrium percentage for the biomolecule as a function of each of the plurality of different glucose concentrations based on the measuring of the glycation percentage over time; identifying the glycation equilibrium percentage and a corresponding glucose concentration that results in the first glycation percentage being maintained within the predetermined glycation percentage range; and incubating the biomolecule with the corresponding glucose concentration over the shelf-life of the biomolecule.

In some embodiments, the method further includes determining a potency level of the biomolecule as a function of glycation percentage of the amino acid.

In any of the various embodiments, the biomolecule may be an antibody. In some examples where the biomolecule is an antibody, the amino acid is located within a variable region that impacts antigen binding. For example, the amino acid may be located within a complementarity determining region (CDR). In examples, the CDR is located within the heavy chain variable region. In some cases, the amino acid is located within HCDR3.

In one aspect, the present invention provides a method for reducing potency of a therapeutic biomolecule in a subject at a time of administration. The method comprises identifying a therapeutic biomolecule comprising one or more amino acid residues subject to glycation, wherein glycation of the one or more amino acid residues reduces potency of the therapeutic biomolecule; and formulating the therapeutic biomolecule with glucose at a concentration greater than 150 mg/dL. In some embodiments, the glucose concentration is greater than 200 mg/dL.

In some embodiments, glycation of the one or more amino acid residues is reduced and potency of the therapeutic biomolecule increases to an equilibrium determined by the subject's blood glucose concentration following administration of the therapeutic biomolecule to the subject.

In some embodiments, the reduced potency of the therapeutic biomolecule at the time of administration reduces the incidence of cytokine release syndrome or infusion related reactions.

In any of the various embodiments, the therapeutic biomolecule may be an antibody. In examples where the therapeutic biomolecule is an antibody, the one or more amino acids may be located within a variable region that impacts antigen binding. For example, the one or more amino acids may be located within a CDR. In examples, the CDR is located within the heavy chain variable region. In some cases, the one or more amino acids is located within HCDR3.

In one aspect, the present invention provides a method for predicting a glycation percentage of an amino acid in a therapeutic biomolecule following administration of the therapeutic biomolecule to a subject, wherein the method comprises identifying an equilibrium glycation percentage associated with the amino acid; identifying a rate at which the amino acid is glycated or de-glycated; identifying an initial glycation percentage associated with the amino acid in the therapeutic biomolecule prior to administration; and predicting the glycation percentage as a function of time following administration of the therapeutic biomolecule based on the rate, a difference between the initial glycation percentage and the equilibrium glycation percentage, and the equilibrium glycation percentage.

In some embodiments, the method discussed above further comprises determining the identified equilibrium glycation percentage associated with the amino acid. In some embodiments, the method discussed above further comprises determining the identified rate at which the amino acid is glycated or de-glycated. In some embodiments, the method discussed above further comprises determining the identified initial glycation percentage associated with the amino acid in the therapeutic biomolecule prior to administration.

In some embodiments, the method further comprises determining the equilibrium glycation percentage at a temperature between 35-40° C. In examples, the temperature is 37° C.

In some embodiments, the method further comprises determining the rate at a temperature between 35-40° C. In examples, the temperature is 37° C.

In some embodiments, the method further comprises determining the equilibrium glycation percentage in vitro as a function of one or more glucose concentrations.

In some embodiments, the method further comprises determining the equilibrium glycation percentage based on equilibrium glycation levels of the amino acid reached in vivo.

In some embodiments, the method further comprises determining the rate in vitro at a glucose concentration of between 3-8 mM glucose.

In some embodiments, the equilibrium glycation percentage corresponds to a glucose concentration of between 3-8 mM glucose.

In some embodiments, the method further comprises using the rate, the difference between the initial glycation percentage and the equilibrium glycation percentage, and the equilibrium glycation percentage in a first order model to predict the glycation percentage.

In any of the various embodiments discussed above, the method further comprises predicting a potency of the therapeutic biomolecule as a function of the glycation percentage and the time post-administration.

In any of the various embodiments, the biomolecule may be an antibody. In an example, the amino acid is located within a variable region that impacts antigen binding. In one example, the amino acid is located within a CDR. In some examples, the CDR is located within the heavy chain variable region. In particular examples, the amino acid is located within HCDR3.

In various embodiments, any of the features or components of embodiments discussed above or herein may be combined, and such combinations are encompassed within the scope of the present disclosure. Any specific value discussed above or herein may be combined with another related value discussed above or herein to recite a range with the values representing the upper and lower ends of the range, and such ranges and all values falling within such ranges are encompassed within the scope of the present disclosure. Other embodiments will become apparent from a review of the ensuing detailed description.

DESCRIPTION OF THE FIGURES

Embodiments are illustrated by way of example and not by way of limitation in the figures of the accompanying drawings.

Mobile phase A: 0.05% Trifluoroacetic acid (TFA) in water; Mobile phase B: 0.045% TFA in Acetonitrile.

Figure 2:
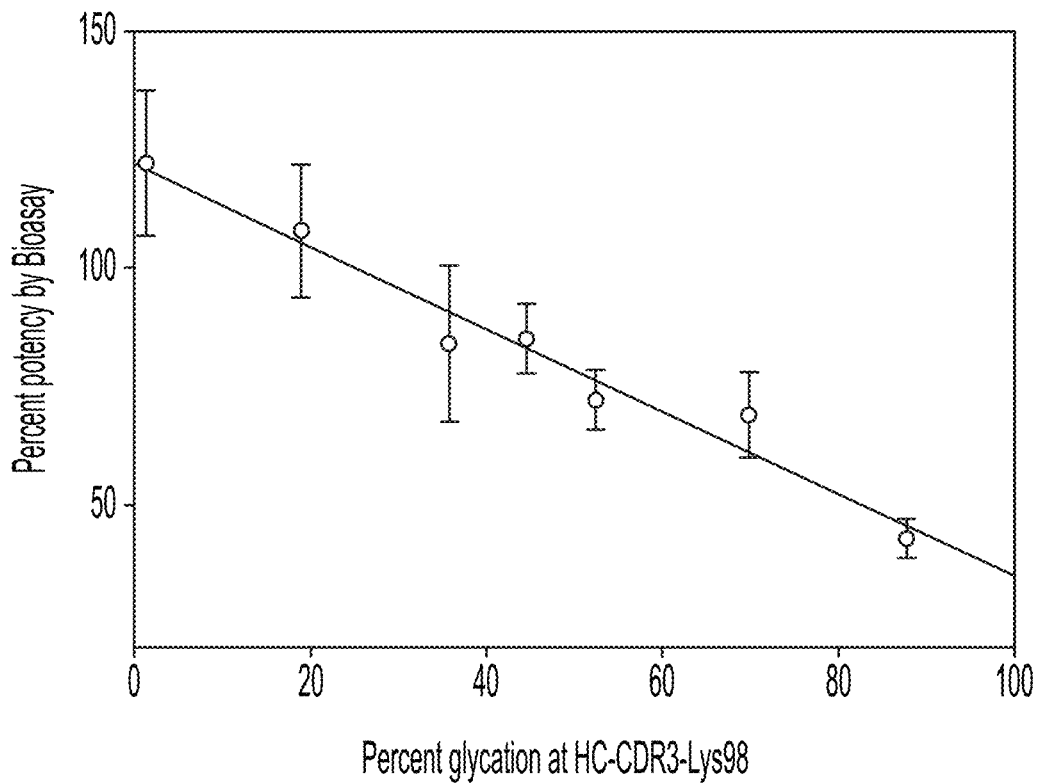

FIG. 2 is a graph illustrating that correlation between the level of glycation at HC-CDR3-Lys98 in mAb-1 and drug potency as measured by a cell-based potency assay is linear and has a correlation coefficient of 0.97. Error bars represent the standard deviation of triplicate potency results.

Figure 3A:
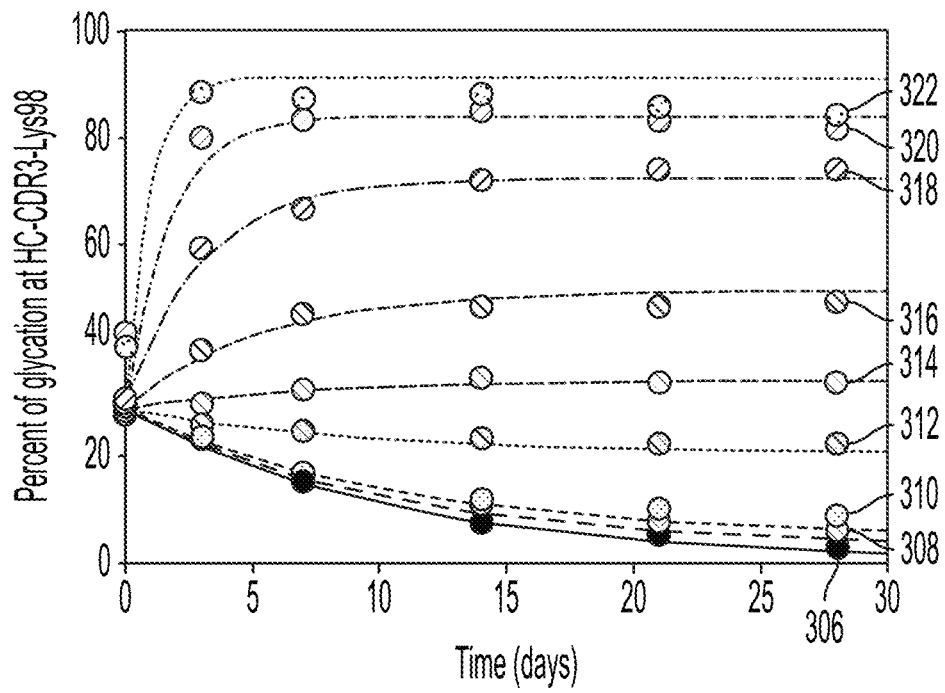

FIG. 3A is a graph illustrating glycation and de-glycation kinetics of 6.9 μM mAb-1 in 30 mM HEPES pH 7.4 with different concentrations of glucose when incubated at 37° C. over the course of 28 days. Circles 306: no glucose; circles 308: 0.3 mM glucose; circles 310: 0.6 mM glucose; circles 312: 3 mM glucose; circles 314: 6 mM glucose; circles 316: 10 mM glucose; circles 318: 28 mM glucose; circles 320: 56 mM glucose; circles 322: 111 mM glucose. Solid lines are from a global analysis using a kinetic model with the best fit $k_1=8.89$ (±1.79) $M^{-1}$ day$^{-1}$ and $k_1=0.09$ (±0.02) day$^{-1}$.

Figure 3B:
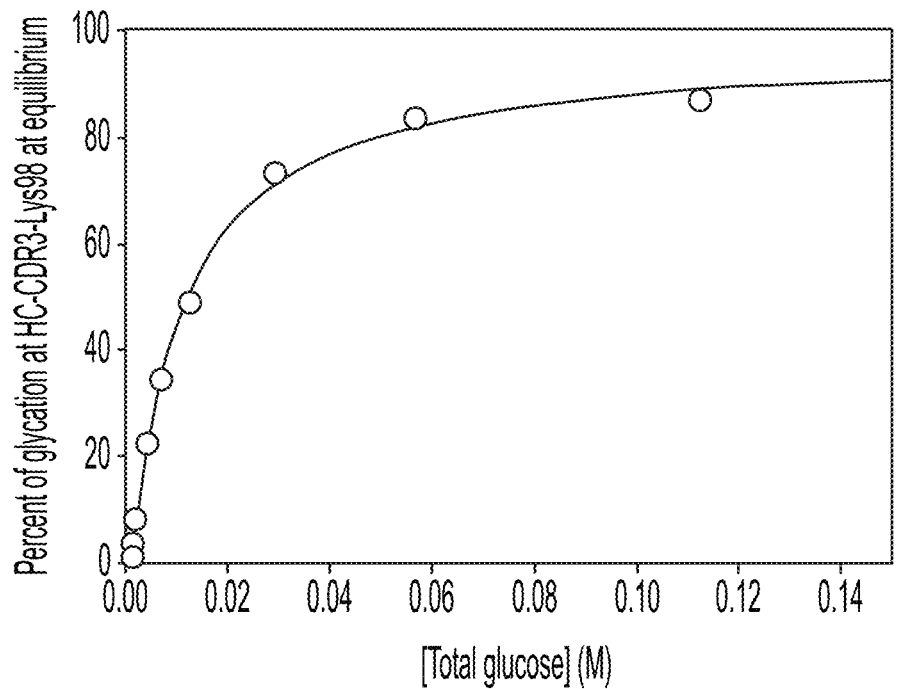

FIG. 3B is a graph illustrating thermodynamic analysis of the glycation reaction. The data shown were determined from the best fit of baseline and amplitude using Equation 5 and Equation 6 (refer to Materials and Methods following the Examples). The solid line is from the thermodynamic analysis with best fit association constant $K=112$ (±40) $M^{-1}$.

Figure 4A:
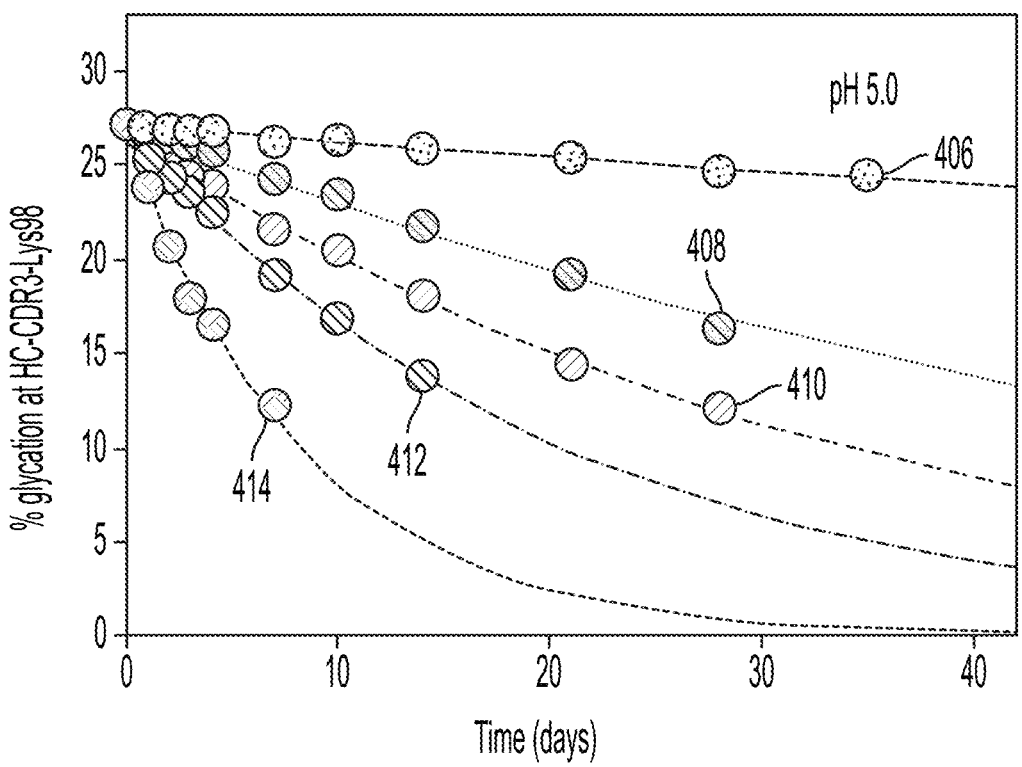
Figure 4B:
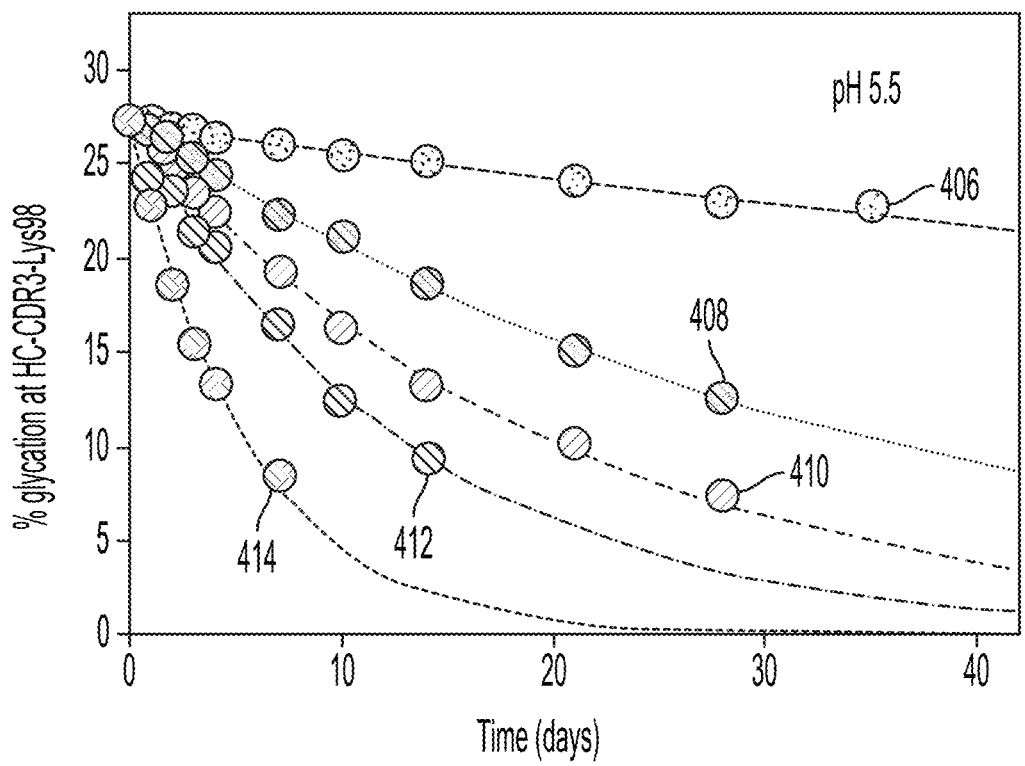
Figure 4C:
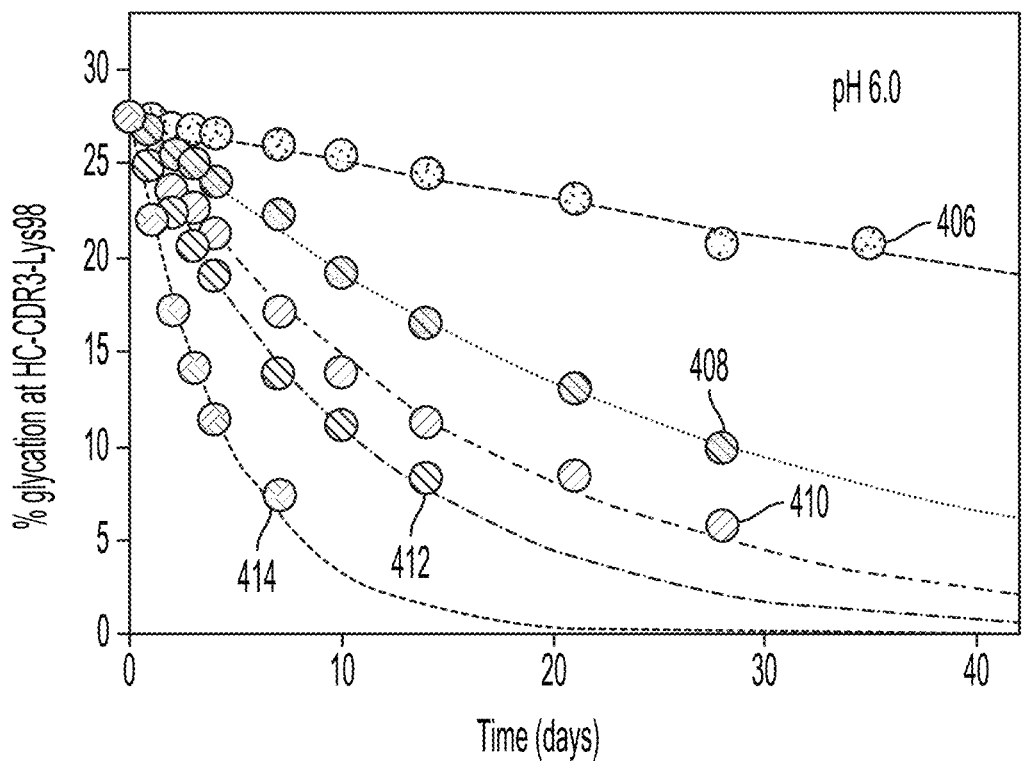

FIGS. 4A, 4B and 4C depict graphs showing mAb-1 de-glycation kinetics at different temperatures and pH. mAb-1 in 10 mM histidine pH 6.0, 292 mM sucrose, and 0.05% polysorbate 20 were incubated at different temperatures, circles 406: 20° C.; circles 408: 30° C.; circles 410: 35° C.; circles 412: 40° C.; circles 414: 45° C., and at pH 5.0 (FIG. 4A), pH 5.5 (FIG. 4B), and pH 6.0 (FIG. 4C). The data at FIGS. 4A-4C were fitted using Equation 6.

Figure 4D:
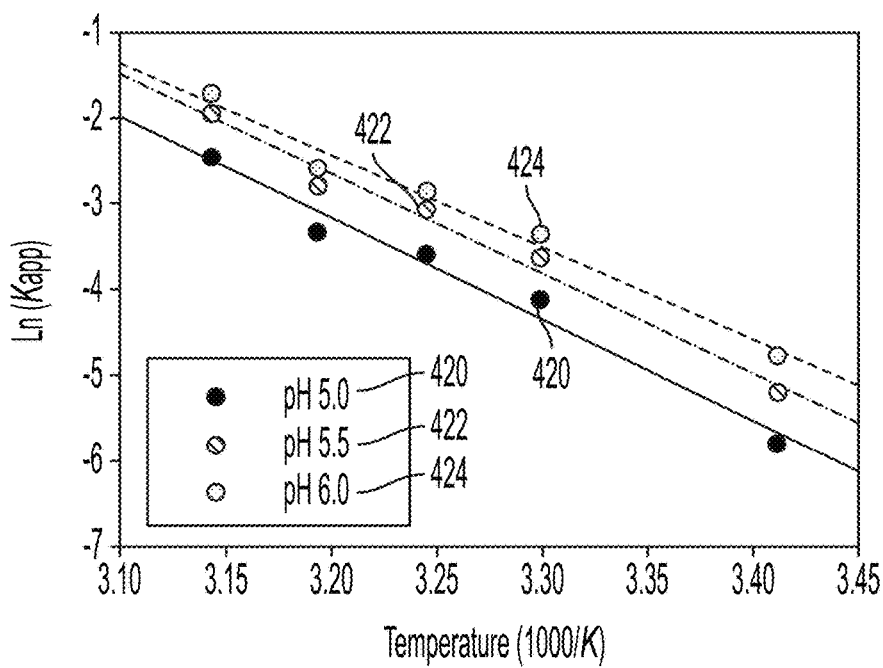

FIG. 4D depicts Arrhenius analysis of mAb-1 de-glycation at different pH. Circles 420: pH 5.0; circles 422: pH 5.5; circles 424: pH 6.0. The lines are the linear fit of each data set at designated pH with correlation coefficients of 0.98. The apparent activation energy ($E_a$) was determined from the slope of the fit.

Figure 4E:
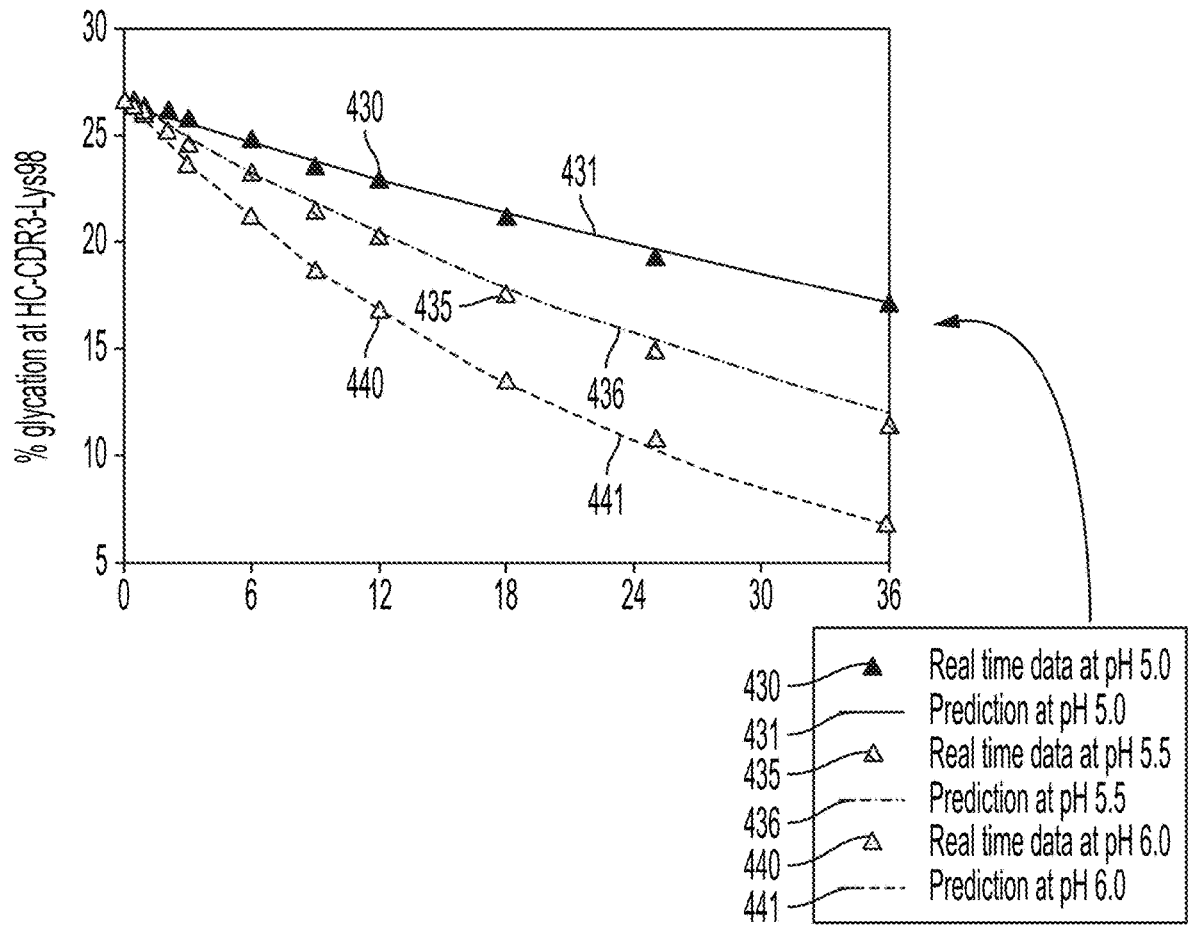

FIG. 4E is a graph showing comparison of predicted and real-time de-glycation kinetics at 5° C. at varying pH. Triangles 430: real-time data at pH 5.0; triangles 435: real-time data at pH 5.5; triangles 440: real-time data at pH 6.0. Line 431: prediction at pH 5.0; line 436: prediction at pH 5.5; line 441: prediction at pH 6.0. Lines 431, 436, and 441 are the predictions of percent glycation generated from Arrhenius analysis.

Figure 5A:
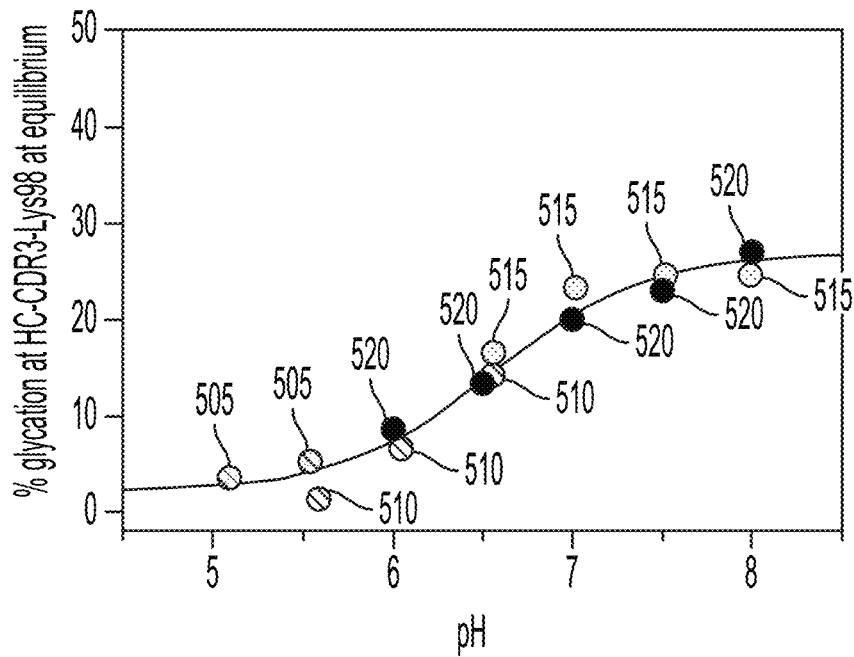
Figure 5B:
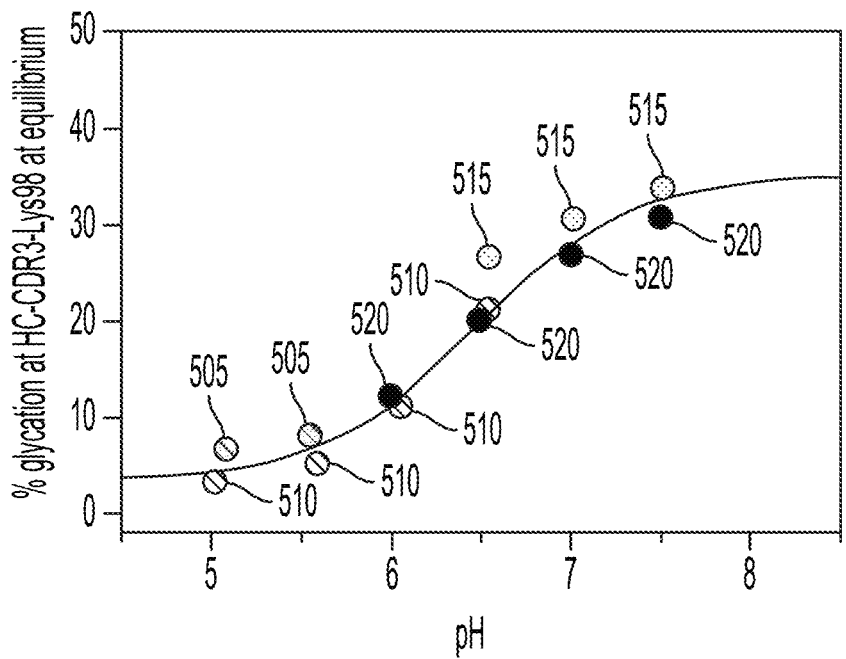
Figure 5C:
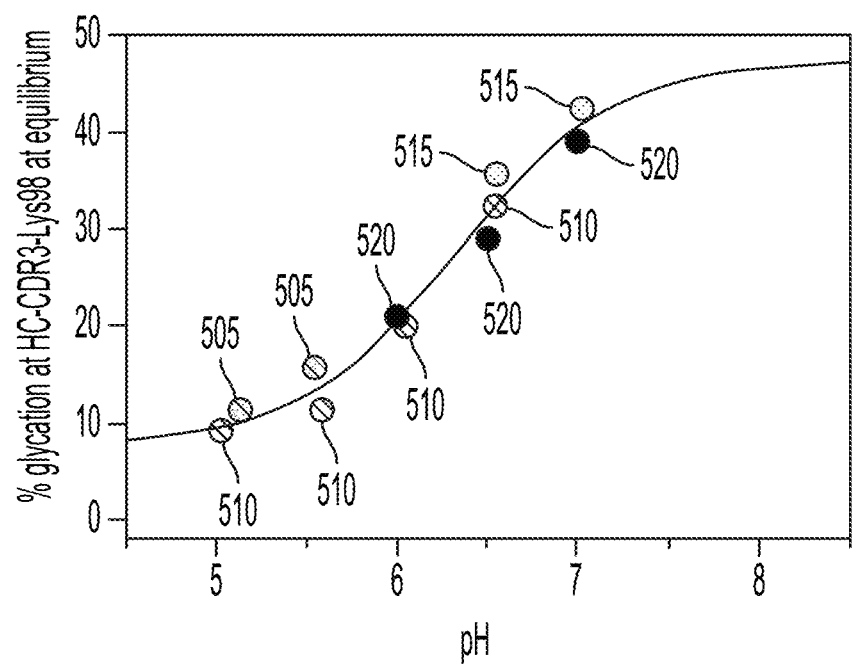

FIGS. 5A, 5B and 5C are graphs showing pH dependence of mAb-1 glycation levels at equilibrium. 6.9 μM mAb-1 was incubated in 30 mM buffers with varying concentrations of glucose: 3 mM (FIG. 5A), 6 mM (FIG. 5B), and 11 mM (FIG. 5C), at 37° C. for 28 days. At FIGS. 5A-5C, buffers are as follows, circles 505: acetate; circles 510: histidine; circles 515: HEPES; circles 520: phosphate. The equilibrium levels of glycation were determined from the apparent kinetic analysis. All three data sets were analyzed globally by Equation 3, demonstrating the $pK_a$ of Lys98 to be 6.7 (6.6, 6.9) and the microscopic association constant, $K_2$, for glycation to be 120 (±26) $M^{-1}$.

Figure 6A:
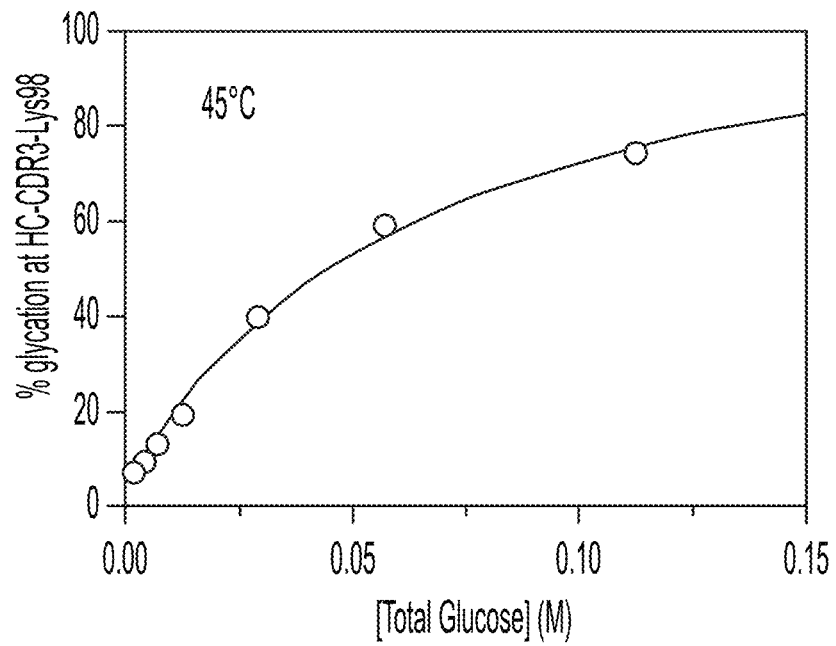
Figure 6B:
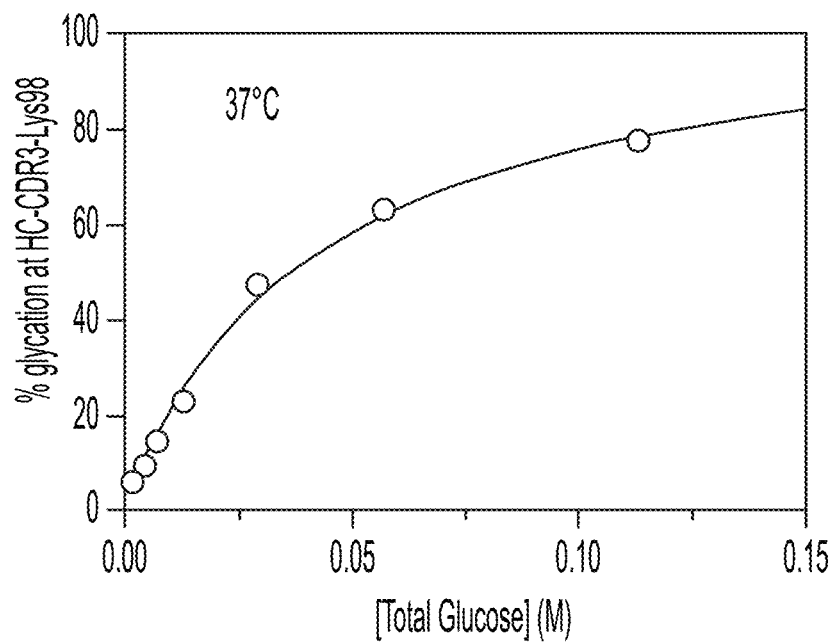
Figure 6C:
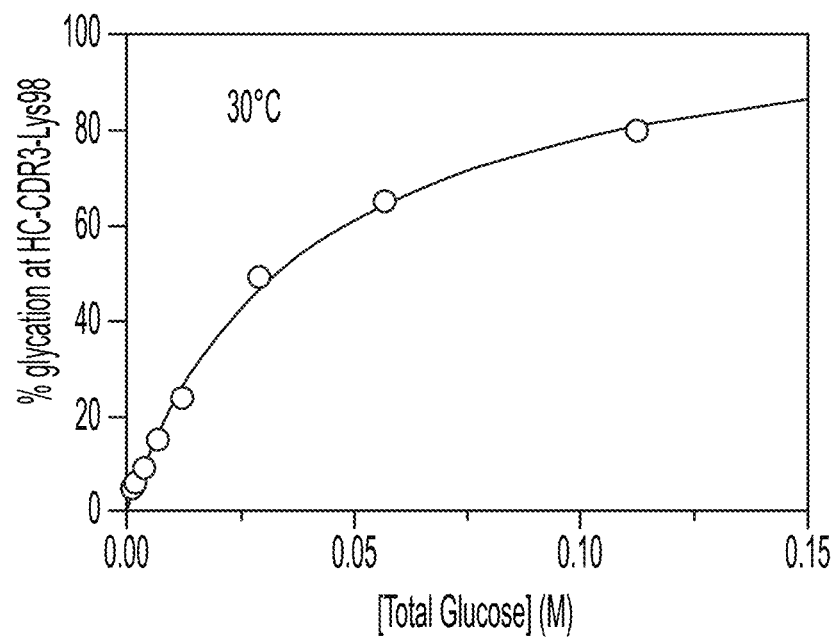
Figure 6D:
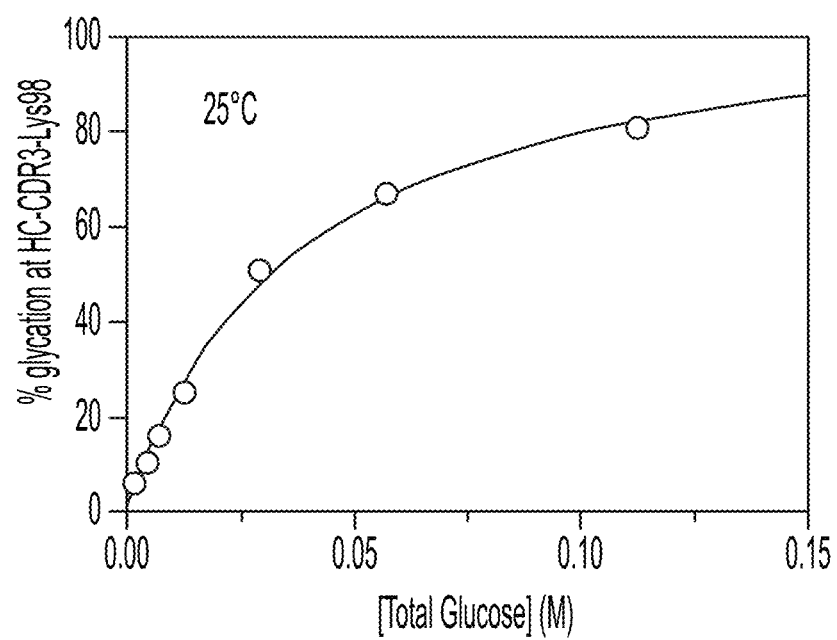
Figure 6E:
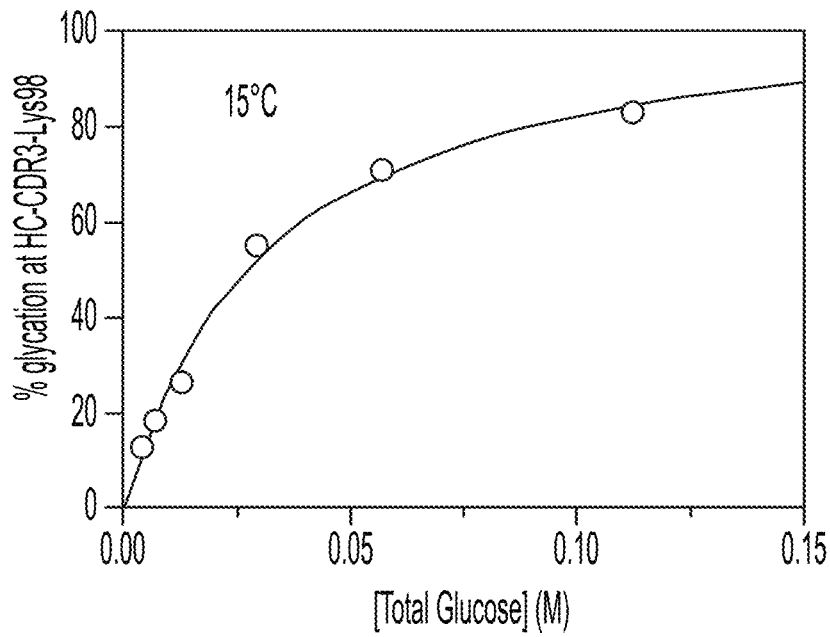

FIGS. 6A, 6B, 6C, 6D and 6E are graphs depicting glycation equilibrium percentages of HC-CDR3-Lys98 as a function of various glucose concentrations at 45° C. (FIG. 6A), 37° C. (FIG. 6B), 30° C. (FIG. 6C), 25° C. (FIG. 6D), and 15° C. (FIG. 6E). Each data point was obtained from kinetic analysis using either Equation 5 or 6, depending on the glycation or de-glycation reaction. Lines are an NLLS analysis using Equation 11.

Figure 7:
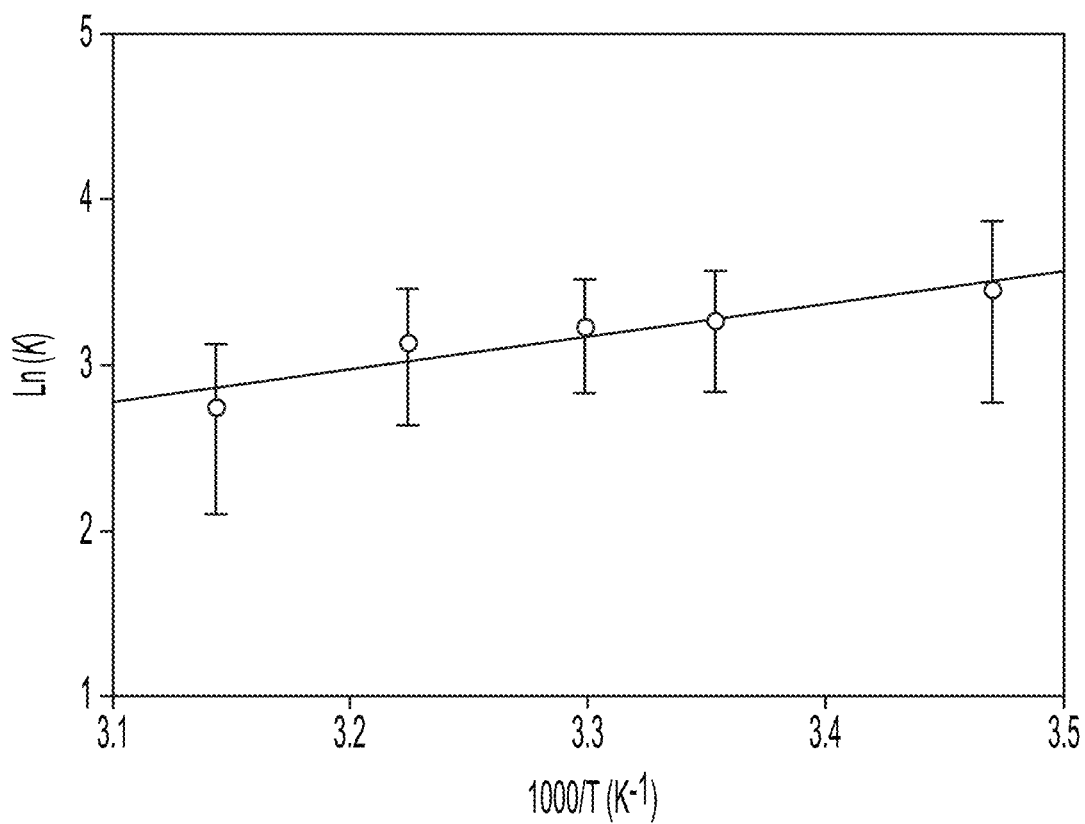

FIG. 7 is a graph illustrating Van't Hoff analysis of mAb-1 glycation equilibrium. The association constant, K, was determined from the thermodynamic analysis of mAb-1 glycation at different temperatures and glucose concentrations. The line in the graph is the linear fit of all data with a correlation coefficient of 0.89.

Figure 8A:
Figure 8B:
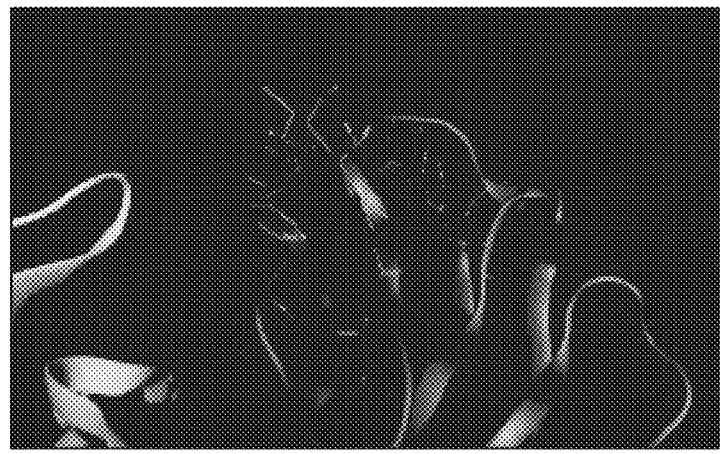
Figure 8C:

FIGS. 8A, 8B and 8C depict a predicted structure of two mAb-1 arms. (FIG. 8A) Predicted local environment of HC-CDR3-Lys98, where this lysine is surrounded by the aromatic rings of Tyr32, Phe27, and Tyr106, and the aliphatic side chain of Val2. (FIG. 8B) Predicted local environment of the HC-CDR3-Lys98 with glucose adduct from MD simulation. (FIG. 8C) Predicted local environment of HC*-CDR3-Lys98, where this Lys is surrounded by Phe27, Tyr32, Tyr109, and Asp112. Unlike HC-CDR3-Lys98 which faces the aromatic rings, HC*-CDR3-Lys98 faces towards the side chain of Asp112.

Figure 9A:
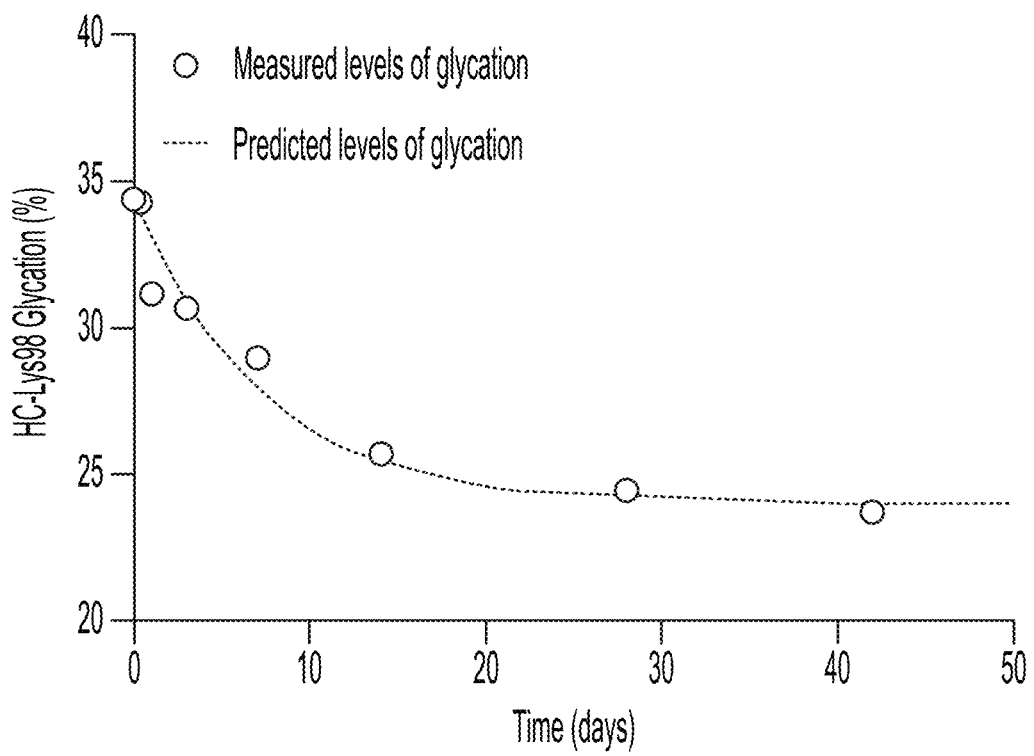
Figure 9B:
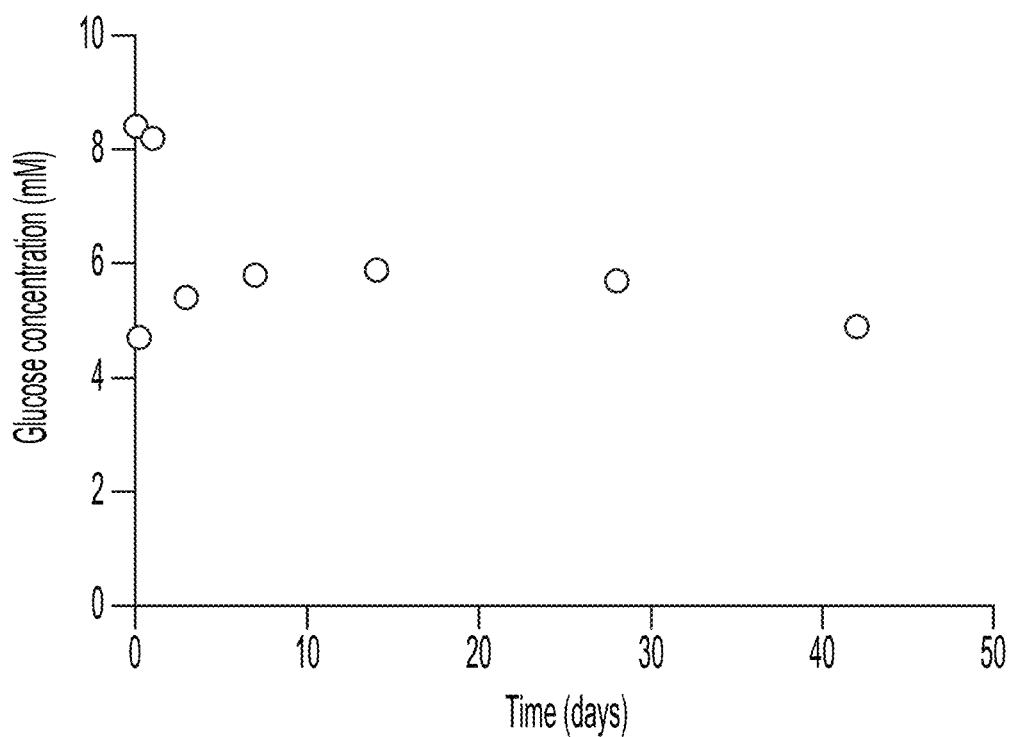

FIGS. 9A and 9B depict measured and predicted levels of HC-CDR3-Lys98 de-glycation in vivo (FIG. 9A) and corresponding measurements of in vivo glucose concentration (FIG. 9B) as a function of time.

Figure 10A:
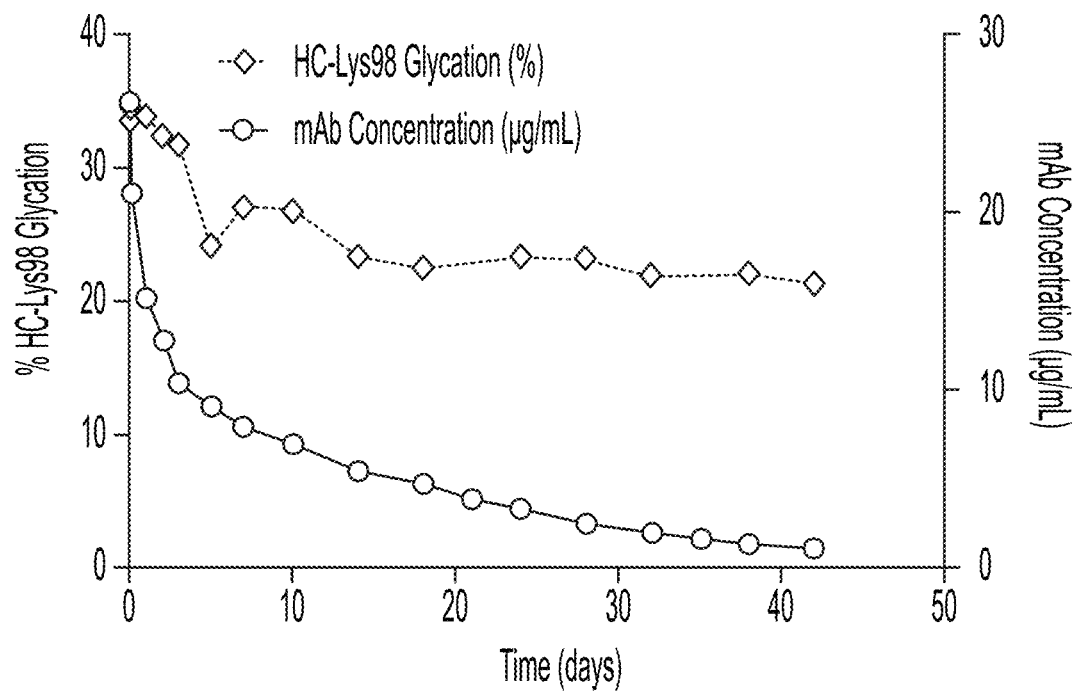
Figure 10B:
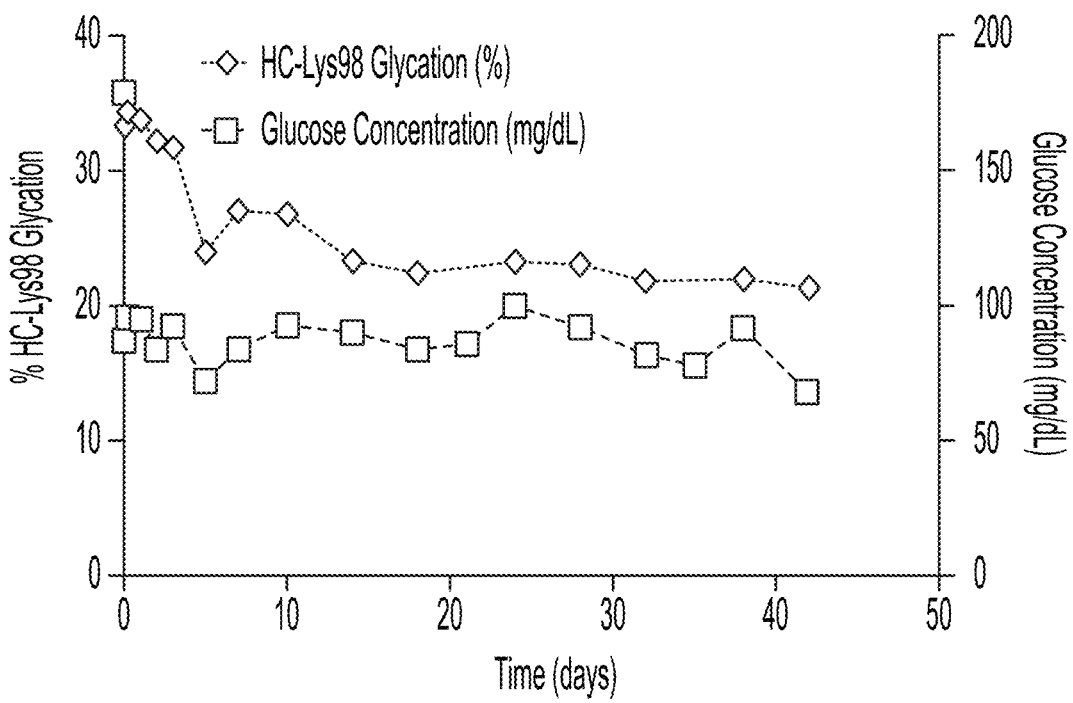
Figure 11A:
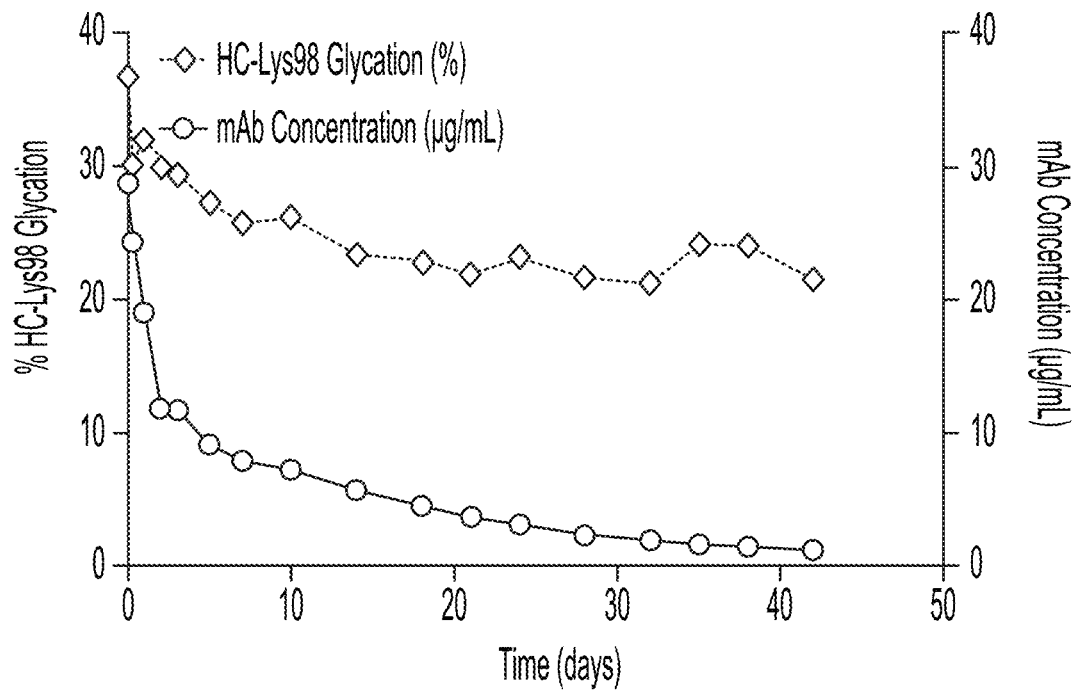
Figure 11B:
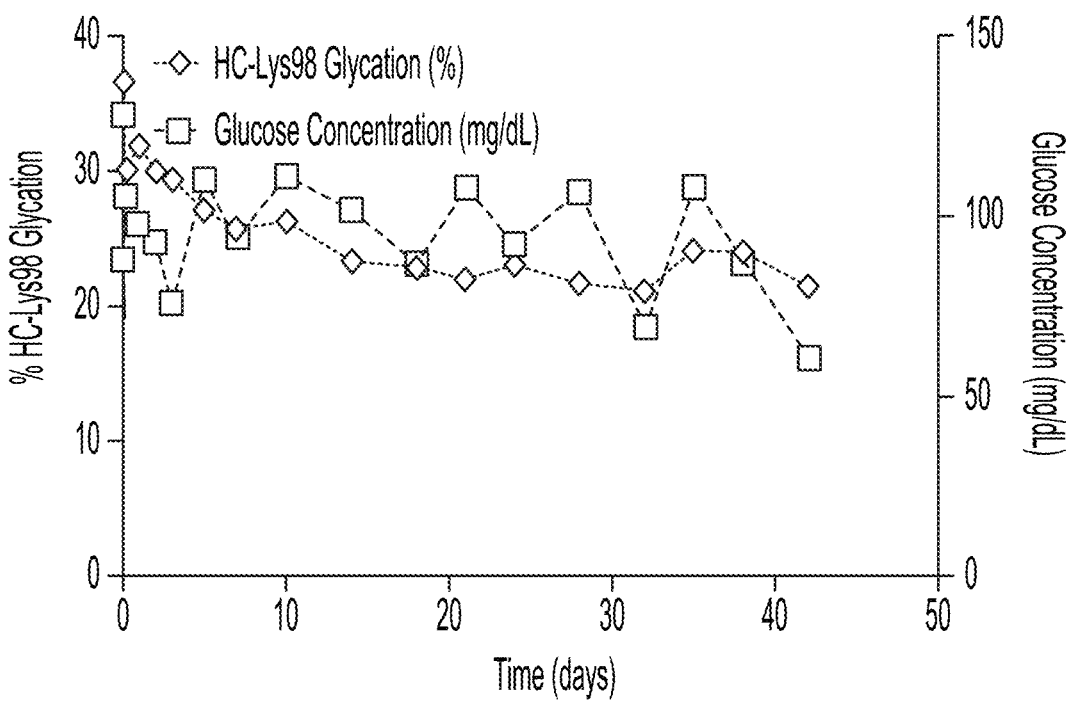
Figure 12A:
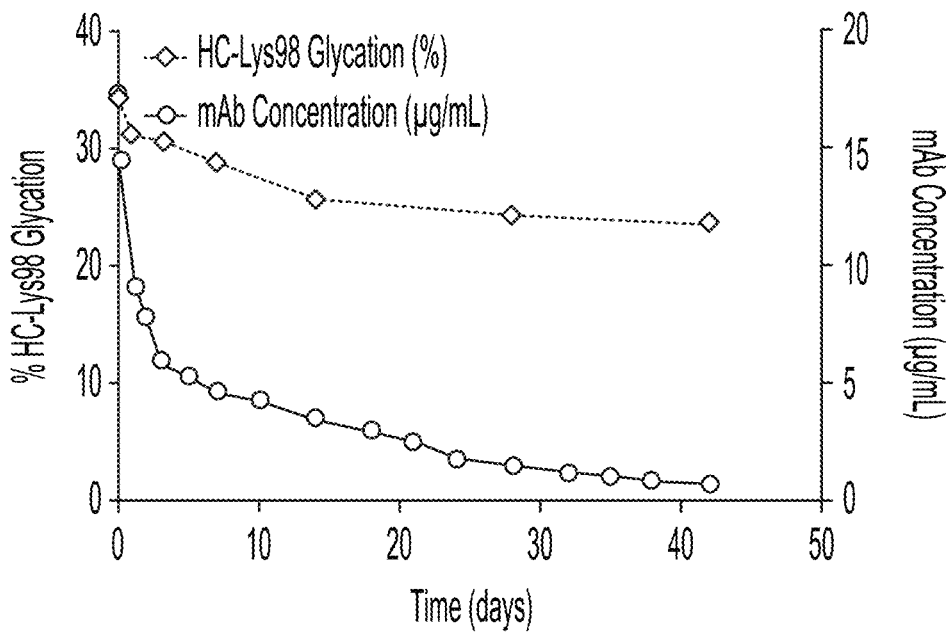
Figure 12B:
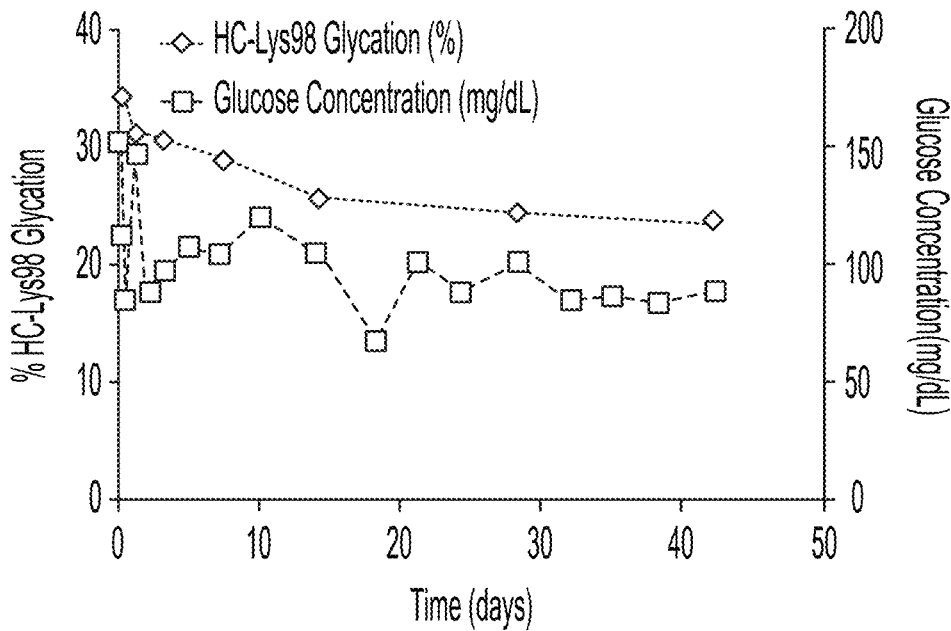

FIGS. 10A, 10B, 11A, 11B, 12A and 12B depict additional plots showing in vivo de-glycation data of therapeutic biomolecules following intravenous injection in monkeys. FIGS. 10A, 11A, and 12A illustrate HC-Lys98 glycation percent plotted along with mAb concentration (μg/mL) as a function of time (days), and FIGS. 10B, 11B, and 12B illustrate HC-Lys98 glycation percent plotted along with measured glucose concentration (mg/dL) as a function of time (days). For each of the mAbs tested, glucose concentration in the bioreactor for producing the mAbs was 300-1000 mg/dL.

DETAILED DESCRIPTION OF THE DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense.

Various operations may be described as multiple discrete operations in turn, in a manner that may be helpful in understanding embodiments; however, the order of description should not be construed to imply that these operations are order-dependent.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Before the present invention is described, it is to be understood that this invention is not limited to particular methods and experimental conditions described, as such methods and conditions may vary. It is also to be understood that the terminology used herein is for the purpose of describing particular embodiments only, and is not intended to be limiting, since the scope of the present invention will be limited only by the appended claims. Any embodiments or features of embodiments can be combined with one another, and such combinations are expressly encompassed within the scope of the present invention.

Unless defined otherwise, all technical and scientific terms used herein have the same meaning as commonly understood by one of ordinary skill in the art to which this invention belongs. As used herein, the term "about," when used in reference to a particular recited numerical value, means that the value may vary from the recited value by no more than 1%. For example, as used herein, the expression "about 100" includes 99 and 101 and all values in between (e.g., 99.1, 99.2, 99.3, 99.4, etc.). Furthermore, recitation of a range of numerical values includes any numerical value encompassed by said range, and/or any range of values included within said range. For example, a numerical range of 1-10 encompasses the range, and additionally encompasses individual numerical values (e.g., 1, 2, 3, 4, 5, 6, 7, 8, 9, 10), and ranges within said numerical range (e.g., 1-2, 1-4, 2-5, 3-7, 4-9, 5-10, and so on).

Although any methods and materials similar or equivalent to those described herein can be used in the practice or testing of the present invention, the preferred methods and materials are now described. All patents, applications and non-patent publications mentioned in this specification are incorporated herein by reference in their entireties.

ABBREVIATIONS USED HEREIN

CDR: Complementarity Determining Region
CEX: Cation Exchange Chromatography
CSF: Colony stimulating factor
ESI: Electrospray Ionization
HC: Heavy Chain
HCVR: Heavy Chain Variable Region
IgG: Immunoglobulin G
IgM: Immunoglobulin M
IFU: Instructions for Use
IEC: Ion Exchange Chromatography
LC-MS: Liquid Chromatography-Mass Spectrometry
LCVR: Light Chain Variable Region
mAb: Monoclonal Antibody
MALDI: matrix-assisted laser desorption/ionization
MGs: Medication guides
MS/MS: Tandem Mass Spectrometry
NLLS: Nonlinear Least Squares
PPIs: Patient Package Inserts
PTMs: Post-translational Modifications
TCEP-HCl: Tris(2-carboxyethyl)phosphine hydrochloride
TFA: Trifluoroacetic Acid
TNF: Tumor necrosis factor
UV: Ultraviolet Definitions The term "agent", as used herein, refers to any protein, peptide, antibody, antigen-binding fragment, or other molecule of interest. In examples, the agent is a protein, peptide, antibody, antigen-binding fragment, etc., capable of being glycated at one or more amino acid residues, for example an amino acid residue important for binding to an antigen. Thus, agent can include a therapeutic agent, a diagnostic agent or a pharmaceutical agent. A therapeutic or pharmaceutical agent is one that alone or together with an additional compound induces the desired response (such as inducing a therapeutic or prophylactic effect when administered to a subject, including treating a subject suffering a disease or condition). Discussed herein, an agent may be referred to as a therapeutic biomolecule.

The term "antibody", as used herein, is intended to refer to immunoglobulin molecules comprised of four polypeptide chains, two heavy chains (HC) and two light chains (LC) inter-connected by disulfide bonds (i.e., "full antibody molecules"), as well as multimers thereof (e.g. IgM) or antigen-binding fragments thereof. Each heavy chain is comprised of a heavy chain variable region ("HCVR" or "$V_H$") and a heavy chain constant region (comprised of domains $C_H1$, $C_H2$ and $C_H3$). In various embodiments, the heavy chain may be an IgG isotype. In some cases, the heavy chain is selected from IgG1, IgG2, IgG3 or IgG4. In some embodiments, the heavy chain is of isotype IgG1 or IgG4, optionally including a chimeric hinge region of isotype IgG1/IgG2 or IgG4/IgG2. Each light chain is comprised of a light chain variable region ("LCVR or "$V_L$") and a light chain constant region ($C_L$). The $V_H$ and $V_L$ regions can be further subdivided into regions of hypervariability, termed complementarity determining regions (CDR), interspersed with regions that are more conserved, termed framework regions (FR). Each $V_H$ and $V_L$ is composed of three CDRs and four FRs, arranged from amino-terminus to carboxy-terminus in the following order: FR1, CDR1, FR2, CDR2, FR3, CDR3, FR4. The term "antibody" includes reference to both glycosylated and non-glycosylated immunoglobulins of any isotype or subclass, and/or to glycated and non-glycated immunoglobulins of any isotype or subclass. The term "antibody" includes antibody molecules prepared, expressed, created or isolated by recombinant means, such as antibodies isolated from a host cell transfected to express the antibody. For a review on antibody structure, see Lefranc et al., IMGT unique numbering for immunoglobulin and T cell receptor variable domains and Ig superfamily V-like domains, 27(1) Dev. Comp. Immunol. 55-77 (2003); and M. Potter, Structural correlates of immunoglobulin diversity, 2(1) Surv. Immunol. Res. 27-42 (1983).

The term antibody also encompasses "bispecific antibody", which includes a heterotetrameric immunoglobulin that can bind to more than one different epitope. One half of the bispecific antibody, which includes a single heavy chain and a single light chain and six CDRs, binds to one antigen or epitope, and the other half of the antibody binds to a different antigen or epitope. In some cases, the bispecific antibody can bind the same antigen, but at different epitopes or non-overlapping epitopes. In some cases, both halves of the bispecific antibody have identical light chains while retaining dual specificity. Bispecific antibodies are described generally in U.S. Patent App. Pub. No. 2010/0331527 (Dec. 30, 2010).

The term "antigen-binding portion" of an antibody (or "antibody fragment"), refers to one or more fragments of an antibody that retain the ability to specifically bind to an antigen. Examples of binding fragments encompassed within the term "antigen-binding portion" of an antibody include (i) a Fab fragment, a monovalent fragment consisting of the VL, VH, CL and CH1 domains; (ii) a F(ab')2 fragment, a bivalent fragment comprising two Fab fragments linked by a disulfide bridge at the hinge region; (iii) a Fd fragment consisting of the VH and CH1 domains; (iv) a Fv fragment consisting of the VL and VH domains of a single arm of an antibody, (v) a dAb fragment (Ward et al. (1989) Nature 241:544-546), which consists of a VH domain, (vi) an isolated CDR, and (vii) an scFv, which consists of the two domains of the Fv fragment, VL and VH, joined by a synthetic linker to form a single protein chain in which the VL and VH regions pair to form monovalent molecules. Other forms of single chain antibodies, such as diabodies are also encompassed under the term "antibody" (see e.g., Holliger et at. (1993) 90 PNAS U.S.A. 6444-6448; and Poljak et at. (1994) 2 Structure 1121-1123).

Moreover, antibodies and antigen-binding fragments thereof can be obtained using standard recombinant DNA techniques commonly known in the art (see Sambrook et al., 1989). Methods for generating human antibodies in transgenic mice are also known in the art. For example, using VELOCIMMUNE® technology (see, for example, U.S. Pat. No. 6,596,541, Regeneron Pharmaceuticals, VELOCIMMUNE®) or any other known method for generating monoclonal antibodies, high affinity chimeric antibodies to a desired antigen are initially isolated having a human variable region and a mouse constant region. The VELOCIMMUNE® technology involves generation of a transgenic mouse having a genome comprising human heavy and light chain variable regions operably linked to endogenous mouse constant region loci such that the mouse produces an antibody comprising a human variable region and a mouse constant region in response to antigenic stimulation. The DNA encoding the variable regions of the heavy and light chains of the antibody are isolated and operably linked to DNA encoding the human heavy and light chain constant regions. The DNA is then expressed in a cell capable of expressing the fully human antibody The term "epitope" refers to an antigenic determinant that interacts with a specific antigen binding site in the variable region of an antibody molecule known as a paratope. A single antigen may have more than one epitope. Thus, different antibodies may bind to different areas on an antigen and may have different biological effects. Epitopes may be either conformational or linear. A conformational epitope is produced by spatially juxtaposed amino acids from different segments of the linear polypeptide chain. A linear epitope is one produced by adjacent amino acid residues in a polypeptide chain. In certain circumstance, an epitope may include moieties of saccharides, phosphoryl groups, or sulfonyl groups on the antigen The term "human antibody", is intended to include antibodies having variable and constant regions derived from human germline immunoglobulin sequences. The human mAbs of the invention may include amino acid residues not encoded by human germline immunoglobulin sequences (e.g., mutations introduced by random or site-specific mutagenesis in vitro or by somatic mutation in vivo), for example in the CDRs and in particular CDR3. However, the term "human antibody", as used herein, is not intended to include mAbs in which CDR sequences derived from the germline of another mammalian species (e.g., mouse), have been grafted onto human FR sequences. The term includes antibodies recombinantly produced in a non-human mammal, or in cells of a non-human mammal. The term is not intended to include antibodies isolated from or generated in a human subject.

The term "binding" in the context of binding of an antibody, Ig, antibody-binding fragment, to either an antigen or other molecule (e.g., sugar), typically refers to an interaction or association between a minimum of two entities, or molecular structures, such as an antibody-antigen interaction, or an antibody-sugar (e.g., glucose) interaction.

For example, binding affinity of an antibody, Ig, or antibody-binding fragment to an antigen may typically correspond to a $K_D$ value of about $10^{-7}$ M or less, such as about $10^{-8}$ M or less, such as about $10^{-9}$ M or less, when determined by, for instance Surface Plasmon Resonance (SPR) technology in a BIAcore 3000 instrument using the antigen as the ligand and the antibody, Ig, or antibody-binding fragment as the analyte (or antiligand). Accordingly, the antibody or other binding protein binds to the predetermined antigen or receptor with an affinity corresponding to a $K_D$ value that is at least ten-fold lower, such as at least 1,000 fold lower, such as at least 10,000 fold lower, for instance at least 100,000 fold lower than its affinity for binding to a non-specific antigen (e.g., BSA, casein).

As discussed herein, binding affinity of an antibody, Ig, or antibody-binding fragment to an antigen can be altered (e.g., decreased) by PTMs (e.g., glycation) to the antibody, Ig, or antibody-binding fragment in a region of the protein important for binding between the antibody, Ig, or antibody-binding fragment and the antigen. The decreased binding affinity can in turn result in a reduced potency of the antibody, Ig, or antibody-binding fragment. As discussed herein, "potency" with regard to an antibody, Ig, or antibody-binding fragment, refers to a measure of drug activity expressed in terms of the amount required to produce an effect of a particular intensity. For example, a highly potent drug (e.g., therapeutic mAb) may evoke a given response at lower concentrations, whereas a drug of lower potency would evoke the same response at higher concentrations. Potency of mAbs can be measured, for example, in a cell-based bioassay that relies on a luminescent signal intensity to correlate drug (e.g., mAb) concentration with activity.

The term "effective amount", as used herein, refers to an amount of agent that is sufficient to generate a desired response, such as reducing or inhibiting one or more signs or symptoms associated with a condition or disease. When administered to a subject, a dosage will generally be used that will achieve target tissue/cell concentrations. In some examples, an "effective amount" is one that treats one or more symptoms and/or underlying causes of any of a disorder or disease.

In some examples, an effective amount is an amount of a pharmaceutical preparation that alone, or together with a pharmaceutically acceptable carrier or one or more additional therapeutic agents, induces the desired response.

In one example, a desired response is to increase the subject's survival time and/or improve the subject's quality of life, for example by reducing a number and/or amount of symptoms associated with a condition or disease. In another example, a desired response is to increase the subject's survival time and/or improve the subject's quality of life by slowing or eliminating progression of disease, for example slowing or eliminating the progression of cancer.

The symptoms and/or underlying cause of a disease, syndrome, viral infection, etc., do not need to be completely inhibited for the pharmaceutical preparation to be effective. For example, a pharmaceutical preparation may decrease the progression of the disease, syndrome, viral infection, etc., by a desired amount, for example by at least 10%, at least 20%, at least 50%, at least 60%, at least 70%, at least 80%, at least 90%, at least 95%, at least 98%, or even at least 100%, as compared to the progression typical in the absence of the pharmaceutical preparation.

In another or additional example, it is an amount sufficient to partially or completely alleviate symptoms of the disease within the subject. Treatment can involve only slowing the progression of the disease temporarily, but can also include halting or reversing the progression of the disease permanently.

Effective amounts of the agents described herein can be determined in many different ways, such as, for example, assaying for a reduction in of one or more signs or symptoms associated with a condition or disease in the subject or measuring the expression level of one or more molecules known to be associated with the condition or disease. Effective amounts also can be determined through various in vitro, in vivo, or in situ assays, including the assays described herein.

The disclosed therapeutic agents can be administered in a single dose, or in several doses, for example hourly, daily, weekly, monthly, yearly, during a course of treatment. The effective amount can be dependent on the subject being treated, the severity and type of the condition being treated, and the manner of administration.

The term "glycation", as used herein, refers to a non-enzymatic glycosylation on protein amine group(s), primarily the alpha amine terminal and epsilon amine group on the lysine side chain. Glycation is a first step towards a more complex Maillard reaction. Glycation can occur when a protein is incubated with, or otherwise contacted by, reducing sugars (e.g., glucose, galactose, fructose). In a glycation reaction, the susceptible (e.g., deprotonated) amine group reversibly condenses with an aldehyde group of the reducing sugar to form an unstable Schiff base intermediate, which can undergo a spontaneous multistep Amadori rearrangement to form a more stable, covalently bonded ketoamine. However, the ketoamine Amadori product can be reversibly driven to lose the sugar adduct under certain conditions.

Protein glycation is a naturally occurring process in vivo, for example human serum albumin (HSA) and hemoglobin have been found to have varying degrees of glycation depending on blood glucose level and the amount of time in circulation. Similarly, proteins or peptides with susceptible amine groups can undergo glycation in vitro. Under stress conditions such as higher temperatures and/or oxidizing environment, the Amadori products may undergo further reactions, generating reactive carbonyl and dicarbonyl compounds which then react with proteins to form more stable and irreversible adducts known as advanced glycation end products (AGEs).

Given the complexity of commercial therapeutic antibody production, glycation is not unusual, but reaction kinetics and extent are currently not predictable. Glycation of mAbs can occur during the fermentation process, where glucose is an energy source for the mAb-producing cells. The level of glycation can be affected by total sugar feed during the process of mammalian cell culture. Variables including but not limited to temperature, pH, time, ionic strength, and the like, may affect kinetics and extent of glycation. The types of sugars present (e.g., hexose sugars) and specific reactivity of accessible amino groups can affect protein glycation, and can increase heterogeneity of therapeutic proteins.

Glycation can in some examples be introduced to proteins (e.g., therapeutic mAbs) during storage conditions by inclusion of reducing sugars in the storage formulation. Even where reducing sugars are not included in a formulation, they may be produced by degradation of higher order carbohydrates (e.g., sucrose), depending on conditions including but not limited to pH (e.g., acidic pH) and temperature (e.g., elevated temperatures).

To date, no specific protein sequence (e.g., primary structure) or generalized (e.g., degenerate) sequence that indicates a potential glycation site, or that signals susceptibility of an amino acid to glycation, has been identified. However, it is possible that three-dimensional local environments could potentially affect the formation of glycation. For example, the reactivity of an amine group can depend on localized conditions which influence amine deprotonation and stabilization of the intermediate before the ketoamine Amadori product is formed. Specifically, histidine residues or basic residues (arginines and other lysines) correlate with glycation occurrence in some proteins with known structures (e.g., liver alcohol dehydrogenase, RNase A, DNase I, albumin, hemoglobin). A catalytic effect of carboxylic acids (e.g., aspartic acid) is also correlated with glycation.

For therapeutic biomolecules such as mAbs, the potential effects of glycation, for example disrupting a biologically functional site or further degradation that induces aggregation, make glycation a potential critical quality attribute (CQA). Discussed herein, the term "CQA" refers to one or more of a physical, chemical, biological, or microbiological property or characteristic that should be within an appropriate limit, range or distribution to ensure a desired product quality.

The term "$K_{ID}$" (M), as used herein, refers to the dissociation equilibrium constant of a particular binding protein-ligand interaction. For example, $K_D$ may refer to the dissociation equilibrium constant between an antibody, Ig, or antibody-binding fragment and an antigen, or between an antibody, Ig, or antibody-binding fragment and a sugar (e.g., glucose) molecule. There is an inverse relationship between $K_D$ and binding affinity, therefore the smaller the $K_D$ value, the higher, i.e., stronger, the affinity. Thus, the terms "higher affinity" or "stronger affinity" relate to a higher ability to form an interaction and therefore a smaller $K_D$ value, and conversely the terms "lower affinity" or "weaker affinity" relate to a lower ability to form an interaction and therefore a larger $K_D$ value. The dissociation equilibrium constant $K_D$ is equal to $1/K$.

The term "$k_1$" ($M^{-1} \times day^{-1}$), as used herein, refers to the association rate constant of a particular protein-sugar (e.g., antibody-glucose) interaction, and is also referred to as a glycation rate.

The term "$k_{-1}$" ($day^{-1}$), as used herein, refers to the dissociation rate constant of a particular protein-sugar (e.g., antibody-glucose) interaction, and is also referred to as a de-glycation rate.

The term "K" ($M^{-1}$), as used herein, refers to the apparent association constant of a particular protein-sugar (e.g., antibody-glucose) interaction. The association constant K can be obtained by dividing $k_1$ by $k_{-1}$.

The terms "$K_1$" and "$K_2$", as used herein, refer to equilibrium constants corresponding to a protein de-protonation reaction, and a protein glycation reaction, respectively, each reaction corresponding to an equilibrium model to quantitatively analyze pH-dependent glycation. More specifically, $K_1$ as used herein pertains to the equilibrium constant for deprotonation of the amine on HC-CDR3-Lys98 side chain, and $K_2$ pertains to the equilibrium constant for the binding of glucose to the de-protonated amine. The $pK_a$ of the ε-amine group of HC-CDR3-Lys98 can be determined from $pK_a=-\log(K_1)$, and, in contrast to K, $K_2$ is a pH-independent, microscopic association constant for the glycation reaction. A lower $pK_a$ value is indicative of a stronger acid, while a higher $pK_a$ is indicative of a weaker acid. The $pK_a$ of a particular group of an amino acid may change depending on protein microenvironment The terms "$k_{app,1}$" and "$k_{app,2}$", as used herein, refer to apparent reaction rate constants of glycation and de-glycation reactions, respectively. As used herein, the term "glycation reaction" refers to an increase in the percent of glycation of a protein over time, and the term "de-glycation reaction" refers to the decrease in the percent of glycation of a protein over time.

The term "$E_a$", as used herein, refers to apparent activation energy corresponding to a minimum amount of energy which has to be provided to compounds to result in a chemical reaction. $E_a$ can be calculated from the Arrhenius equation based on de-glycation kinetics at different temperatures. $E_a$ can be reduced to thereby increase a rate of a reaction, or can be increased which in turn can reduce a rate of the reaction. One factor that can reduce activation energy is temperature, for example an increase in temperature can cause a rise in energy levels of the molecules involved in a particular reaction, thereby increasing the rate of the reaction. Activation energy can also be altered in other ways, for example particular reactions may proceed faster or slower depending on pH. In general, the process of speeding up a reaction by reducing its activation energy is referred to as catalysis, and the factor that contributes to the lowering of the activation energy is called a catalyst. Hence, catalysts as discussed herein include but are not limited to temperature and pH.

The term "Arrhenius behavior" or "exhibiting Arrhenius behavior" as used herein, refers to reactions for which the plot of the natural log (ln) of $k_{app}$ vs inverse temperature (1/T) yields a straight line. The slope of the line of an Arrhenius plot is proportional to the activation energy $E_a$, where the higher the activation energy (e.g., steeper the slope), the stronger the temperature dependency of the rate constant ($k_{app}$) for the particular reaction. Hence, broadly speaking, a reaction that exhibits Arrhenius behavior pertains to a reaction that is influenced by temperature.

"Contacting," as used herein, includes bringing together at least two substances in solution or solid phase.

The term "bottom-up mass spectrometry", as used herein, refers to mass spectrometry methods in which purified proteins (or complex protein mixtures) are subjected to proteolytic cleavage, and the peptide products are analyzed by MS.

The term "top-down mass spectrometry", as used herein, refers to mass spectrometry methods where intact protein ions are introduced into the gas phase and are fragmented and analyzed in the mass spectrometer, yielding the molecular mass of the protein as well as protein ion fragment ladders.

The term "cytokine", as used herein, refers to a diverse group of soluble proteins and peptides released from cells which act as humoral regulators at nano- to picomolar concentrations, and which, either under normal or pathological conditions, modulate the functional activities of individual cells and tissues. These proteins also mediate interactions between cells directly and regulate processes taking place in the extracellular environment. Many growth factors and cytokines act as cellular survival factors by preventing programmed cell death. Cytokines include both naturally occurring peptides and variants that retain full or partial biological activity. Specific cytokines have autocrine, paracrine, and/or endocrine activity and, through receptor binding, can elicit a variety of responses depending on the cytokine and the target cell. Among the many function of cytokines are the control of cell proliferation and differentiation and the regulation of angiogenesis and immune and inflammatory responses.

The term "cytokine storm" or "cytokine release syndrome", as used herein, refers to a physiological reaction that can occur in humans or other animals in which the innate immune system causes an uncontrolled and excessive release of pro-inflammatory cytokines, which can ultimately seriously harm or even cause death in the human or animal experiencing the cytokine storm/syndrome. Cytokine storms are associated with a wide variety of infectious and noninfectious diseases, and can in some examples be induced in response to introduction into the human or animal a foreign substance such as a therapeutic biomolecule (e.g., monoclonal antibody). Cytokines associated with a cytokine storm can include but are not limited to interferons, interleukins, chemokines, colony stimulating factors (CSFs), and tumor necrosis factors (TNFs).

The terms "reduce" or "decrease", as used herein, refers to reducing the quality, amount, or strength of something. In one example, glycation of a therapeutic biomolecule (e.g., therapeutic monoclonal antibody) can reduce a potency of the therapeutic biomolecule under circumstances where the glycation occurs in a region of the therapeutic biomolecule important for its function, for example in a region that confers specificity between the therapeutic biomolecule and a target molecule. In an example where the therapeutic biomolecule is an antibody, glycation in one or more CDRs corresponding to a HC or a LC, preferably a CDR corresponding to a HC, more preferably a HC CDR3, can reduce potency of the antibody.

General Description

As discussed herein, there is a need for methodology that can be used to reliably predict rates at which glycation/de-glycation occurs in a biomolecule both in vitro and in vivo, specifically a therapeutic biomolecule (e.g., therapeutic antibody), as a function of at least one or more of sugar concentration (e.g., glucose concentration), time, temperature, and other variables including, but not limited to, pH.

Methods of Predicting a Glycation Percentage in a Biomolecule In Vitro

A therapeutic biomolecule such as a monoclonal antibody may have any number of potential glycation reaction sites, hence identification and characterization of glycation in therapeutic biomolecules can be challenging. Glycation in certain regions of a therapeutic biomolecule not important for specifically recognizing (e.g., binding) a target antigen may be tolerated without a reduction in potency, however stability may still be impacted. Alternatively, glycation of an amino acid reside important for binding of a target antigen can reduce potency, which in turn may adversely impact the effective amount of therapeutic intended to be given to a subject in need thereof. In a case where an effective amount of a bio-therapeutic intended to be administered to a subject is unknowingly reduced due to a decreased potency resulting from glycation, effectiveness of the treatment may be degraded. For example, glycation of an amino acid in a CDR (e.g., CDR1, CDR2, CDR3) of an antibody HC, or in some examples an antibody LC may reduce potency. Hence, for therapeutic biomolecules such as mAbs, glycation is a potential CQA for which methods of predicting glycation/de-glycation rates in vitro, for example under storage conditions, are needed.

Within the scope of this disclosure are analytical methods for assessing glycation of therapeutic biomolecules (e.g., antibodies). Examples include but are not limited to charge-based methods, LC-MS methods, colorimetric assays, and boronate affinity chromatography. Of charge-based methods, capillary isoelectric focusing (cIEF) or imaged capillary electric focusing (icIEF) comprise charge-based separation methods capable of detecting glycation due to loss of positive charge on particular glycation sites. Another charge-based method is ion exchange chromatography (IEC), which may be used to resolve glycated and non-glycated proteins that have surface charge differences. Cation exchange chromatography (CEX) uses a negatively charged ion exchange resin with an affinity for molecules having net positive surface charges, can be used for both preparative and analytical purposes, and is useful for separation of a large range of molecular weight biomolecules. CEX relies on the principle that a protein's net surface charge changes with pH in a manner dictated by the protein's isoelectric point (pI). At a pH equal to a protein's pI, the protein will carry no net charge. Alternatively, at pH lower than the protein's pI, or higher than the protein's pI, the protein will carry a net positive, or net negative charge, respectively. Because glycation impacts the charge of a protein, CEX can be used to resolve glycated and non-glycated forms of a same protein, for example a therapeutic monoclonal antibody.

LC-MS methods can be used to determine glycation level, either by matrix-assisted laser desorption/ionization (MALDI) or electrospray ionization (ESI). For example, as each glycation site shows a +162 Da mass shift, a top-down mass spectrometry approach can be used as a quick estimation of glycation level in a particular biomolecule. To locate a particular glycation site, a bottom-up peptide mapping approach may be used. For example, since trypsin is inhibited by glycation of lysine residues, a missed tryptic cleavage with a +162 Da mass addition can indicate a glycated lysine residue.

With regard to colorometric assays, a ketoamine formed from antibody glycation can be quantitated by the nitroblue tetrazolium (NBT) reduction assay. NBT is reduced by the ketoamine form of glycated protein, which results in a change in absorbance at 525 nm.

With regard to boronate affinity chromatography (BAC), it is a technique for isolation an enrichment of cis-diol compounds. Boronate functional groups on the stationary phase form a tetrahedral anion under alkaline pH conditions, which can interact with the cis-1,2-diol arrays found on sugar molecules and separate glycated from non-glycated species. To elute the glycated species, the interactions can be disrupted by lowering the pH or adding a competing source of hydroxyl groups, for example sorbitol.

As mentioned, glycation of a therapeutic biomolecule may or may not impact potency. The impact of glycation on potency can be examined by generating biomolecule solutions with varying levels of glycation (e.g., between 0% and 100%, between 1% and 90%, and so on). In one example, biomolecule solutions with varying levels of glycation can be produced by mixing glycated and non-glycated versions of the biomolecule at various ratios. The different biomolecule solutions can then be tested in any assay relevant to assess activity of the solutions. For example, the biomolecule solutions can be tested in a cell-based or non-cell-based assay for which a readout of the assay relates to potency of the various biomolecule solutions. As a representative example, a cell-based assay may rely on expression levels of a reporter gene (e.g., luciferase) to assess potency of various biomolecule solutions. Potency can be a measure of an ability of a particular biomolecule solution to repress expression, or enhance expression, compared to other biomolecule solutions that are otherwise the same but for having greater or lesser glycation percentages. The data obtained can be plotted to reveal a potency metric (e.g., percent potency) as a function of glycation percentage in the various biomolecule solutions. In examples, the greater the glycation percentage, the lesser the potency of the biomolecule, and the lesser the glycation percentage, the greater the potency.

Measures of potency can be corroborated with one or more other assays, for example binding assays. Binding assays relevant to the present disclosure can include but are not limited to assays in which binding affinity of the therapeutic biomolecule (or a portion thereof) to an target (e.g., antigen) is assessed. Such assays include but are not limited to Förster resonance energy transfer (FRET)-based binding assays, bioluminescence resonance energy transfer (BRET)-based binding assays, isothermal titration calorimetry (ITC), surface plasmon resonance (SPR) technology (e.g., in a BIAcore 3000 instrument using the antigen as ligand and the therapeutic biomolecule as the analyte, or antiligand), and the like. The binding affinity of a therapeutic biomolecule may be impacted as a function of an extent to which the biomolecule is glycated, provided the glycation corresponds to an amino acid residue implicated in recognizing and binding to the target molecule. For example, affinity between a therapeutic biomolecule and a target molecule may be decreased as glycation percentage is increased, and this affinity-glycation percentage relationship may be correlated with and/or be indicative of potency of the therapeutic biomolecule as a function of glycation.

Because potency can change as a function of glycation of therapeutic biomolecules such as therapeutic antibodies, an ability to predict glycation levels of a therapeutic biomolecule as a function of one or more variables including but not limited to time, pH, temperature, ionic strength, and the like, could improve an ability to ensure administration of a therapeutic biomolecule with a particular desired potency. For example, glycation of a monoclonal antibody may occur during a fermentation process where glucose is an energy source for mAb-producing cells and/or the level of glycation may be affected by the total sugar feed during the mammalian cell culture process. Then, glycation level may further change (e.g., increase or decrease) over time depending on conditions under which the antibody is stored prior to administration. For example, the biomolecule may undergo de-glycation in a case where sugar (e.g., glucose) is not included in the storage formulation, or is included at a level at which de-glycation is favored. Alternatively, it is possible that a biomolecule may undergo additional glycation in a case where sugar is included in the storage formation, for example where the sugar is included at a concentration which favors increased glycation.

It is herein recognized that de-glycation rates may be faster at higher temperatures, and slower at lower temperatures. Because storage conditions of therapeutic biomolecules are generally at lower temperatures (e.g., 5° C. or less, for example 4° C. or less, or 0° C. or less, such as −20° C. or less, for example −80° C.), an ability to accurately know de-glycation rates at these lower temperatures would be advantageous. However, measuring de-glycation rates at these lower temperatures may be challenging and time-consuming. Instead, methodology that enables determination of de-glycation rates at higher temperatures (e.g., 20-50° C.), such that de-glycation rates can then be predicted at lower temperatures (e.g., 5° C. or less) would be advantageous.

Thus, in an embodiment, methodology is herein disclosed to measure de-glycation parameters at higher temperatures, such that de-glycation parameters can be predicted at lower temperatures (e.g., temperatures at which therapeutic biomolecules are stored). In an example, the methodology involves determining apparent reaction rate constants (e.g., "$k_{app,2}$" as herein disclosed) of a de-glycation reaction using an apparent first order de-glycation reaction (refer to Equation 6 in the Materials and Methods following the Examples)

at higher temperatures (e.g., two or more temperatures between 20-60° C., for example 20-50° C., such as 20-45° C.) over predetermined time frames (e.g., 5-40 days) in the absence of sugar (e.g., glucose), and plotting the natural logs of the apparent reaction rate constants against inverse temperature (1000/K). Under circumstances where the natural log of the apparent rate constants decreases approximately linearly with decreasing temperature, the data can be fit with a straight line (e.g., correlation coefficient of 0.95 or higher, for example 0.98 or higher) to enable extrapolation of apparent de-glycation reaction rate constants to lower temperatures, such as temperatures where the therapeutic biomolecules are stored (e.g., 5° C. or less). In this way, de-glycation apparent reaction rate constants can be predicted at lower temperatures by relying on actual data obtained at higher temperatures. Using the predicted de-glycation apparent rate constant at a particular lower temperature (e.g., 5° C.), a predicted de-glycation profile can be simulated (e.g., via Equation 6 in the Materials and Methods following the Examples) for that particular lower temperature over any desired time-frame (e.g., 10 days to 1 year, or even more than one year, such as two years, three years, five years, or more). Specifically, the predicted de-glycation profile may comprise a change in a glycation percentage of a particular therapeutic biomolecule over time at the selected temperature.

As discussed above, other variables such as pH may impact glycation/de-glycation reactions. Hence, in embodiments, the above-discussed methodology may be performed at two or more (e.g., 3) different pH levels. The Arrhenius equation (equation 7 in the Materials and Methods following the Examples) can be used to determine apparent activation energy ($E_a$) for de-glycation reactions at the different pH levels. Specifically, the apparent activation energy ($E_a$) at each pH can be determined from a slope of the linear fit of the plot of the natural log of the determined apparent reaction rate constants vs. inverse temperature. This enables an understanding of how pH impacts de-glycation rates, for example lower apparent activation energies may correspond to faster de-glycation rates, and higher apparent activation energies may correspond to slower de-glycation rates. This information may be used/relied upon when formulating a particular composition comprising the therapeutic biomolecule for storage. As an example, a pH corresponding to a higher apparent activation energy may be selected if the goal is to slow a rate of de-glycation during storage. In another example, a pH corresponding to a lower apparent activation energy may be selected if the goal is to increase a rate of de-glycation during storage.

By enabling the ability to predict glycation percentage as a function of time at temperatures at which therapeutic biomolecules are stored, it may be possible to administer an effective amount of the therapeutic biomolecule to a subject in need thereof regardless of how long the therapeutic biomolecule has been stored. For example, in a situation where de-glycation of a therapeutic biomolecule occurs during storage, a lesser dosage may be administered to a subject if the biomolecule has been stored longer (e.g., the glycation percentage is lesser and hence of a higher potency), and a greater dosage may be administered to the subject if the biomolecule has been stored for a lesser time duration (e.g., the glycation percentage is greater and hence of a lesser potency), such that a same potency of the therapeutic is delivered to the subject regardless of storage time. In additional or alternative examples, it may be desirable to adjust dosage as a function of time, in response to worsening or improving signs or symptoms associated with a disease or condition, and in such examples the potency of the therapeutic as a function of storage time may be used to ensure that the adjusted dosage corresponds to a desired potency of the therapeutic biomolecule being administered.

Information pertaining to potency in relation to dosage as a function of time in storage conditions (e.g., at a particular temperature) may be included, for example, as part of one or more of patient package inserts (PPIs), instructions for use (IFU), medication guides (MGs), and the like. Discussed herein, PPIs refer to patient labeling that is part of the FDA-approved drug labeling. PPIs are developed by the manufacturer, approved by the FDA, and are required to be dispensed with specific products or classes of products. Other PPIs may be submitted to the FDA voluntarily by the manufacturer and approved by the FDA, but their distribution is not mandated. Discussed herein, IFUs refer to patient labeling that is developed by the manufacturer, approved by the FDA, and dispensed with specific products that have complicated dosing instructions to help the patient use the product properly. Discussed herein, MGs are paper handouts that come with many prescription medicines. The guide addresses issues that are specific to particular drugs and drug classes, and they contain FDA-approved information that can help patients avoid serious adverse events. The FDA requires that MGs be issued with certain prescribed drugs and biological products when the Agency determines that 1) certain information is necessary to prevent adverse effects, 2) patient decision-making should be informed by information about a known side-effect with a product, or 3) patient adherence to directions for the use of a product are essential to its effectiveness.

For example, a patient may be informed, by way of a PPI, IFU, MG, or the like as to appropriate dosage to take of a particular therapeutic as a function of storage duration. Additionally or alternatively, a doctor or pharmacist may recommend or prescribe a particular dosage that is dependent on the predicted relationship between potency, drug dosage, and storage time.

The above-described methodology can be used for therapeutic biomolecules where it is desirable that under storage conditions, sugar (e.g., glucose) is not included in the formulation. In other words, such methodology relies on a determination of glycation percentage prior to storage, where the particular therapeutic biomolecule undergoes de-glycation over time during storage.

Methods of Maintaining a Glycation Percentage of a Biomolecule During Storage

In another embodiment, it is herein recognized that it may in some examples be desirable to ensure that a glycation percentage of a therapeutic biomolecule, such as a therapeutic antibody, remains constant (e.g., does not vary by more than 0.1%, or more than 0.5%, or more than 1%, or more than 5%, or more than 10%) over the course of a predetermined amount of time under storage conditions. For example, similar to that discussed above, a particular glycation percentage may be associated with a particular potency, and it may be desirable to maintain that particular glycation percentage, and hence, particular potency, for the lifetime of the therapeutic biomolecule storage until the therapeutic is administered to a subject in need thereof. In such an example, it may be understood that the dosage may be adjusted to increase activity of the therapeutic, without accounting for any change in potency as a result of changes to glycation levels.

In order to arrive at a concentration of sugar (e.g., glucose) to be included in a formulation that comprises a therapeutic biomolecule capable of reversibly undergoing glycation/de-glycation reactions, at least two variables may be considered. Specifically the at least two variables may pertain to potency of the therapeutic biomolecule as a function of glycation level (e.g., glycation percentage), and the equilibrium level of glycation (e.g., glycation equilibrium percentage). With the desired potency level experimentally determined as the function of glycation level, a next step may be to determine a concentration of sugar (e.g., glucose) needed in a formulation to maintain the particular glycation level over time during storage conditions. The process of determining the concentration of sugar needed in the formulation to maintain the particular glycation level may comprise incubating the biomolecule having the glycation percentage corresponding to the desired potency level with a variety of different glucose concentrations, and determining the glycation equilibrium percentage for the biomolecule for each of the different glucose concentrations. In such a methodology, the range of glucose concentrations may be selected to ensure that at least a portion of the glucose concentrations are expected to result in the biomolecule undergoing increased glycation over time, and that at least another portion of the glucose concentrations are expected to result in the biomolecule undergoing a de-glycation reaction over time, with both the glycation reaction and de-glycation reactions reaching equilibrium (e.g., plateauing) after some amount of time. By selecting a range of sugar concentrations such that both glycation reactions and de-glycation reactions occur, it may be likely or expected that at least one or more of the concentrations of sugar tested will result in little to no change in glycation percentage over time. It may be understood that the concentrations of sugar that do not result in further glycation or de-glycation reactions comprise the concentration that, if included in a formulation, will be sufficient to maintain the desired glycation percentage during a time frame at which the therapeutic biomolecule is stored.

For example, there may be a concentration of sugar that results in a change of glycation percentage of less than 0.1%, or less than 0.5%, or less than 1%, or less than 5%, or even in some examples a change of less than 10% may be acceptable. Referring to FIG. 3A with respect to Example 3 below, a glucose concentration between the 3 mM and the 6 mM concentrations selected may be understood to correspond to glucose concentration for which little to no change in glycation percentage would be expected.

Also within the scope of this disclosure is methodology whereby a therapeutic biomolecule may be incubated in a particular concentration of sugar (e.g., glucose) so that a desired glycation percentage is reached within some predetermined amount of time (e.g., within 1 day, within two days, within 5 days, within 10 days, within 15 days, within one month, and so on). As a representative example, a desired glycation percentage of a therapeutic biomolecule may comprise 40%, and an initial glycation percentage may comprise 25-27% following purification thereof. A concentration of glucose to be included in a formulation may be empirically determined such that, within the predetermined amount of time, glycation percentage of the therapeutic biomolecule reaches the desired 40% equilibrium glycation level and is then maintained at that equilibrium subsequently during storage conditions. In examples, the therapeutic biomolecule may be kept at a higher temperature (e.g., 20-40° C., or whatever temperature the glycation equilibrium determinations were conducted at) until the desired glycation percentage is inferred to be reached, and then the therapeutic biomolecule may be transferred to storage conditions (e.g., 5° C. or less).

Methods for Reducing an Initial Potency of a Therapeutic Biomolecule In Vivo

It is herein recognized that the reversible nature of glycation as a function of sugar (e.g., glucose) concentration may under some circumstances enable an ability to control the potency of a therapeutic biomolecule as a function of an extent (e.g., glycation percentage) to which the therapeutic biomolecule is glycated. As discussed above, one manner in which a potency can be controlled can include mixing of therapeutic biomolecules having different glycation percentages at defined ratios, to thereby obtain a solution of therapeutic biomolecules having a particular glycation percentage. Another example may include incubating a therapeutic biomolecule that is glycated to some extent with a predetermined amount of sugar (e.g., glucose), such that the therapeutic biomolecule reaches a glycation equilibrium at the desired glycation percentage. In such examples, a patient can be administered a therapeutic biomolecule having a predetermined potency.

However, it is additionally herein recognized that due to the reversible nature of glycation, glycation/de-glycation reactions involving a therapeutic biomolecule may in some examples occur in vivo following administration to a subject. Whether a glycation reaction or a de-glycation reaction occurs in vivo can depend on a number of factors, including but not limited to initial glycation percentage of the therapeutic biomolecule upon administration to a subject, and concentration of sugar (e.g., glucose) in the body of the subject receiving the therapeutic biomolecule. For example, a therapeutic biomolecule having very little to no glycation upon administration may, over time in circulation, become glycated to some glycation equilibrium percentage based on glucose concentration in the bloodstream. On the other hand, a therapeutic biomolecule that is more heavily glycated (for example 50% glycation) may undergo a de-glycation reaction over time in circulation, to similarly reach some glycation equilibrium percentage based on glucose concentration in the bloodstream. In a case where a glycation reaction occurs over time in circulation (e.g., the therapeutic biomolecule becomes more glycated), potency of the biomolecule may be reduced over time as compared to initial potency of the biomolecule upon administration. Alternatively, in a case where a de-glycation reaction occurs over time in circulation (e.g., the therapeutic biomolecule becomes less glycated), potency of the biomolecule may be increased over time in circulation as compared to initial potency of the biomolecule upon administration.

It is herein recognized that in some examples it may be advantageous to administer to a patient in need, a therapeutic biomolecule with an initial potency that then changes over time (increases or decreases potency) upon administration. For example, it is known that administration of a foreign substance such as a therapeutic biomolecule to a subject can under some circumstances induce some level of a cytokine storm in the subject. One option for decreasing a potential for a therapeutic biomolecule to induce a cytokine storm or other undesirable response in a subject may include administering to the subject the therapeutic biomolecule at a reduced potency, with an expectation that potency will increase over time in circulation. This may be achieved by controlling a glycation percentage of a therapeutic biomolecule to a first glycation percentage for administration to a subject, such that upon administration of the therapeutic biomolecule glycation percentage changes (e.g., decreases) to a second glycation percentage (equilibrium glycation percentage) over time in circulation. This may provide the effect of enabling, in a single dosage, a therapeutic biomolecule that initially has a reduced potency which decreases a potential for eliciting a cytokine storm, and for which potency is increased over time in circulation.

To provide a therapeutic biomolecule with a reduced potency that increases over time in circulation following its administration, the initial glycation percentage needs be higher than an equilibrium glycation percentage of the therapeutic biomolecule in vivo. The glycation equilibrium percentage of the therapeutic biomolecule in vivo is a function of circulating glucose concentration (e.g., average glucose concentration) during a time frame that the therapeutic biomolecule is in circulation. For example, glucose levels in a subject may vary over time as a function of one or more variables including but not limited to food intake, exercise duration and/or intensity, stress levels, fasting duration, etc. Hence, average glucose levels over time may thus be lower for some individuals, and higher for other individuals. For example, individuals with poor blood sugar control (e.g., insulin resistance) may be prone to higher blood glucose values on average.

As a representative example, upon administration of a therapeutic biomolecule to a subject, the therapeutic biomolecule may reach a glycation equilibrium percentage of 20-25% after some amount of time. Factors that can influence the time it takes to reach equilibrium can include but are not limited to initial glycation percentage, de-glycation (or in some examples glycation) reaction rate (e.g., which may be a function of how susceptible to glycation a particular amino acid is), and glucose concentration variability over time. Hence, with regard to the above example, a therapeutic biomolecule having an initial glycation percentage of 50% may decrease to the glycation equilibrium percentage of 20-25% over some amount of time. On the other hand, if the therapeutic biomolecule were to be administered with a glycation percentage lower than the in vivo glycation equilibrium percentage, for example, 5% glycation, then the therapeutic biomolecule may become glycated over time in vivo to reach the glycation equilibrium percentage of 20-25% over time in circulation. Of course, different glycation equilibrium percentages are possible for different individuals depending on individual glucose levels. For example, a glycation equilibrium percentage may be 30-35% for individuals with higher average glucose levels, and a glycation equilibrium percentage may be 15-20% for individuals with lower average glucose levels.

Hence, an extent to which a therapeutic biomolecule changes potency over time in vivo from an initial potency to a final potency (e.g., potency determined by glycation equilibrium potential in vivo) may be understood to be a function of a difference in initial glycation percentage and the in vivo equilibrium glycation percentage. Accordingly, the initial glycation percentage can be selected such that the therapeutic biomolecule exhibits a predetermined level of reduced potency (e.g., greater initial glycation percentage) that increases over time to the potency defined by the circulating glucose concentration, or such that the therapeutic biomolecule exhibits a predetermined level of increased potency that decreases over time to the potency defined by the circulating glucose concentration.

In an example where the initial glycation percentage is higher than the in vivo glycation equilibrium percentage and hence exhibits reduced potency upon initial administration to a subject, which then increases over time, the initial reduced potency may result in one or more of the following effects. For example, the reduced initial potency may have the effect of decreasing one or more signs or symptoms associated with a cytokine storm or other adverse immune response stemming from the administration of the therapeutic biomolecule, as compared to an otherwise same therapeutic biomolecule without the initial reduced potency (e.g., glycated to a lesser extent) For example, the reduced initial potency may result in a decreased extent of release of one or more cytokines, as compared to an otherwise same therapeutic biomolecule lacking the reduced initial potency. The one or more cytokines for which the extent of release may be decreased can include but are not limited to interferons, interleukins, chemokines, CSFs, TNFs, and the like. The reduction in one or more signs or symptoms may include a reduction in one or more of redness, swelling or edema, fever, pain, loss-of-function, or other signs or symptoms associated with acute inflammation.

It is further herein recognized that there may be additional or alternative advantages to regulating potency of a therapeutic biomolecule over time in vivo. Specifically, a concentration of therapeutic biomolecule in circulation may decrease over time depending on one or more relevant pharmacokinetic parameters. As concentration decreases over time, this decrease reduces the effective amount of therapeutic biomolecule in circulation. It is herein recognized that this reduction in effective amount of therapeutic biomolecule in solution may be at least partially alleviated by providing the therapeutic biomolecule at a reduced initial potency which then increases over time in circulation to the greater potency associated with the in vivo glycation equilibrium percentage. Specifically, as concentration of the therapeutic biomolecule is decreasing, the potency may be correspondingly increasing, hence offsetting the decrease in concentration in terms of effectiveness of the therapeutic to at least some extent.

Thus, based on the above, it may be understood that in order to impart on a therapeutic biomolecule a reduced initial potency that increases over time in vivo post-administration, the initial glycation percentage need be greater than the in vivo equilibrium glycation percentage. As average glucose values may vary for individuals, one aspect of the methodology herein disclosed pertaining to reduced initial potency that increases during circulation may include obtaining a glucose concentration profile for an individual prior to administering a therapeutic biomolecule, so that the extent to which the initial potency is reduced and changes in potency over time can be effectively controlled/predicted. Obtaining the glucose concentration profile may be accomplished by obtaining blood glucose measurements over a predetermined time period sufficient to reflect typical blood glucose concentrations associated with the individual. The glucose measurements may be obtained, for example, via one or more of a traditional finger-stick glucose meter and/or a continuous glucose monitoring system. With an understanding of an individual's glucose concentration profile (e.g., average glucose concentration as a function of time), initial glycation percentage of a therapeutic biomolecule may be selected based on a desired extent to which potency is reduced initially and which increases over time to the final potency dictated by the subject's glucose concentration profile.

As a representative example, typical glucose concentration in a bioreactor may be between 300-1000 mg/dL. Depending on the concentration, susceptibility of one or more amino acids to glycation, etc., a particular therapeutic biomolecule produced in such a bioreactor may be glycated to some level which can be empirically determined. In some examples, the glycation percentage of a particular therapeutic following purification from a bioreactor biomolecule may be greater than, or in other examples lesser than, an equilibrium glycation percentage of the therapeutic biomolecule realized in vivo following administration to a subject. The extent of glycation of the therapeutic biomolecule can be further manipulated depending on desired initial glycation percentage, for example by mixing defined ratios of different solutions of the therapeutic biomolecule glycated to different extents, by incubating the therapeutic biomolecule with glucose concentrations such that a desired initial glycation equilibrium concentration is reached, and the like. However, as discussed in detail above, in absence of glucose, a therapeutic biomolecule may undergo de-glycation over time in storage. Thus, in case where a particular initial glycation percentage is desired to be provided to a subject, for example such that the biomolecule exhibits reduced initial potency as discussed, the biomolecule may need be formulated with an amount of sugar (e.g., glucose) to maintain the desired initial glycation percentage over time in storage prior to administration. In general, it may be understood that such a sugar concentration in the formulation may be such that the initial glycation percentage of the therapeutic biomolecule is maintained at a greater glycation percentage than the corresponding glycation equilibrium percentage realized in vivo following administration. The glycation equilibrium percentage realized in vivo is dependent on individual blood glucose profiles, which may be in a typical range of 70-180 mg/dL for healthy individuals, and for which the range may be greater (e.g., 70-500 mg/dL or even higher) for individuals with complications due to underlying disease such as diabetes (e.g., Type I or Type II). Because, in a case where it is desired to provide a therapeutic biomolecule with a reduced initial potency that then increases over time in circulation post-administration (the initial glycation percentage is greater than that of the corresponding glycation equilibrium percentage reached in vivo), it may be understood that the therapeutic biomolecule may need be formulated with a sugar concentration (e.g., glucose concentration) that is at least somewhat higher than the average blood glucose values for the particular individual. Hence, in examples, the therapeutic biomolecule may be formulated with glucose at a concentration of 150 mg/dL or higher, or 160 mg/dL or higher, or 170 mg/dL or higher, or 180 mg/dL or higher, or 190 mg/dL or higher, or 200 mg/dL or higher, or 210 mg/dL or higher, or 220 mg/dL or higher, or 230 mg/dL or higher, or 240 mg/dL or higher, or 250 mg/dL or higher, or 260 mg/dL or higher, or 270 mg/dL or higher, or 280 mg/dL or higher, or 290 mg/dL or higher, or 300 mg/dL or higher, or 310 mg/dL or higher, or 320 mg/dL or higher, or 330 mg/dL or higher, or 340 mg/dL or higher, or 350 mg/dL or higher, or 360 mg/dL or higher, or 370 mg/dL or higher, or 380 mg/dL or higher, or 390 mg/dL or higher, or 400 mg/dL or higher, or 410 mg/dL or higher, or 420 mg/dL or higher, or 430 mg/dL or higher, or 440 mg/dL or higher, or 450 mg/dL or higher, or 460 mg/dL or higher, or 470 mg/dL or higher, or 480 mg/dL or higher, or 490 mg/dL or higher, or 500 mg/dL or higher, or 520 mg/dL or higher, or 540 mg/dL or higher, or 560 mg/dL or higher, or 580 mg/dL or higher, or 600 mg/dL or higher, or 620 mg/dL or higher, or 640 mg/dL or higher, or 660 mg/dL or higher, or 680 mg/dL or higher, or 700 mg/dL or higher, or 720 mg/dL or higher, or 740 mg/dL or higher, or 760 mg/dL or higher, or 780 mg/dL or higher, or 800 mg/dL or higher, or 820 mg/dL or higher, or 840 mg/dL or higher, or 860 mg/dL or higher, or 880 mg/dL or higher, or 900 mg/dL or higher, or 920 mg/dL or higher, or 940 mg/dL or higher, or 960 mg/dL or higher, or 980 mg/dL or higher, or 1000 mg/dL or higher, or 1100 mg/dL or higher, or 1200 mg/dL or higher, or 1300 mg/dL or higher, or 1400 mg/dL or higher, or 1500 mg/dL or higher, or 1600 mg/dL or higher, or 1700 mg/dL or higher, or 1800 mg/dL or higher, or 1900 mg/dL or higher, or 2000 mg/dL or higher.

Methods for Predicting a Glycation Percentage of an Amino Acid in a Therapeutic Biomolecule in vivo Glycation percentage of an amino acid in a therapeutic biomolecule (e.g., therapeutic antibody) can impact potency, and hence potency can vary over time in a subject receiving the therapeutic biomolecule. Hence, the ability to predict glycation percentage over time following administration may be used improve treatment regimens.

It is herein recognized that parameters determined in vitro pertaining to glycation/de-glycation rates for a particular therapeutic biomolecule may be used in conjunction with glycation equilibrium levels (e.g., percentages) (obtained from in vitro and/or in vivo studies), and initial (e.g., pre-administration) glycation level (e.g., percentage) in order to predict glycation percentage as a function of time post-administration of the therapeutic biomolecule to a subject. Specifically, referring to equations 5 and 6 (see the Materials and Methods following the Examples), three fitting parameters can be used to enable prediction of glycation percentage in vivo as a function of time, the fitting parameters being amplitude (e.g., difference between initial glycation level and glycation equilibrium level), baseline, and glycation/de-glycation rate. For a glycation reaction (equation 5), equilibrium level of glycation is amplitude plus baseline. For a de-glycation reaction (equation 6), the equilibrium level of glycation is baseline.

Initial glycation level may be determined by LC-MS/MS as discussed above, and in some examples mixing of particular ratios of therapeutic biomolecules glycated to varying extents can be used to generate therapeutic biomolecules glycated to some predetermined percentage.

Glycation/de-glycation rate(s) useful for predicting in vivo glycation percentage as a function of time may be obtained in vitro at a temperature similar to body temperature (e.g., 35-40° C., for example 37° C.), and at glucose concentrations expected to be typically found in the corresponding subject (e.g., humans, monkeys, dogs, cats, mice, and the like). For example, blood glucose values may generally vary between about 4 mM to about 7 mM, hence for the in vivo prediction methodology useful in, for example humans or monkeys, experiments to determine glycation/de-glycation rate(s) may be conducted in the presence of about 3 mM to about 8 mM glucose, for example between about 4-7 mM glucose, for example any glucose concentration corresponding to a value selected from 3-8 mM glucose.

Equilibrium glycation percentage may be determined in one or more ways. Equilibrium glycation percentage is a function of the concentration of glucose seen by a particular therapeutic biomolecule. Example 3 below, along with corresponding FIGS. 3A-3B, discuss/illustrate how equilibrium glycation percentage may be obtained based on in vitro studies where a therapeutic biomolecule is incubated with varying concentrations of glucose. Specifically, equilibrium glycation percentage determined in vitro at a concentration or concentrations that are substantially similar to those seen in vivo (e.g., 3-7 mM glucose) may be used as the equilibrium glycation percentage for the in vivo prediction methodology.

Additionally or alternatively, equilibrium glycation percentage may be determined from in vivo studies where one or more subjects receive a particular therapeutic biomolecule, and serum samples are then obtained at various time points and LC-MS/MS performed to determine glycation levels associated with the circulating therapeutic biomolecule. When glycation levels plateau (e.g., do not fluctuate outside of a predetermined range for a predetermined amount of time), then it may be determined that the glycation percentage corresponding to the plateau comprises the glycation equilibrium percentage.

It is within the scope of this disclosure that glycation equilibrium levels for particular therapeutic biomolecules may be correlated with in vivo glucose levels, for example average glucose levels over some predetermined amount of time (e.g., 2-60 days, or any number of days in between). In vivo glucose levels may be determined, for example, via a continuous glucose monitoring (CGM) system or other manner, such as traditional finger-stick applications. Hence, based on such an association, a subject with a first glucose level may correspond to a first glycation equilibrium percentage for a particular therapeutic biomolecule, whereas a subject with a second glucose level may correspond to a second glycation equilibrium percentage for the same therapeutic biomolecule. Correlating glucose values for particular individuals with expected glycation equilibrium percentages for a particular therapeutic biomolecule may improve the accuracy in terms of predicting a glycation percentage for the particular therapeutic biomolecule in vivo.

As one example, glycation equilibrium percentages may be obtained during the course of a clinical trial for a particular therapeutic biomolecule. In such an example, blood glucose values may be regularly monitored, such that a correlation between blood glucose values and glycation equilibrium percentage may be established. Then, this correlation may be used subsequently in the methodology to predict glycation percentages in vivo for subsequent individuals where blood glucose levels for those individuals is either measured or inferred (e.g., inferred based on qualitative attributes such as weight, exercise level, eating habits, and the like, and/or from one or more past glucose tests performed as part of a hospital or doctor visit, or other lab test results), and those blood glucose levels are used to infer glycation equilibrium percentage.

As mentioned, the ability to predict glycation percentage as a function of time following administration of a therapeutic biomolecule to a subject may enable a prediction of potency as a function of time associated with that therapeutic biomolecule in vivo. For example, prior to administration, potency as a function of glycation percentage may be established in vitro (refer to Example 1 and FIG. 2). The resultant data may be fit to an equation that enables potency to be predicted for any glycation percentage between 0-100%. Thus, predicting glycation percentage in vivo may in turn enable prediction of potency of the therapeutic biomolecule as a function of time post-administration to the subject.

EXAMPLES

The following examples are put forth so as to provide those of ordinary skill in the art with a complete disclosure and description of how to make and use the methods and compositions of the invention, and are not intended to limit the scope of what the inventors regard as their invention. Efforts have been made to ensure accuracy with respect to numbers used (e.g., amounts, temperature, etc.) but some experimental errors and deviations should be accounted for. Unless indicated otherwise, parts are parts by weight, molecular weight is average molecular weight, temperature is in degrees Centigrade, and pressure is at or near atmospheric.

Example 1. Charge Variants Analysis of mAb-1 by CEX and LC-MS Peptide Mapping Reveal a Species with Reversible Glycation at HC-CDR3-Lys98

Figure 1A:
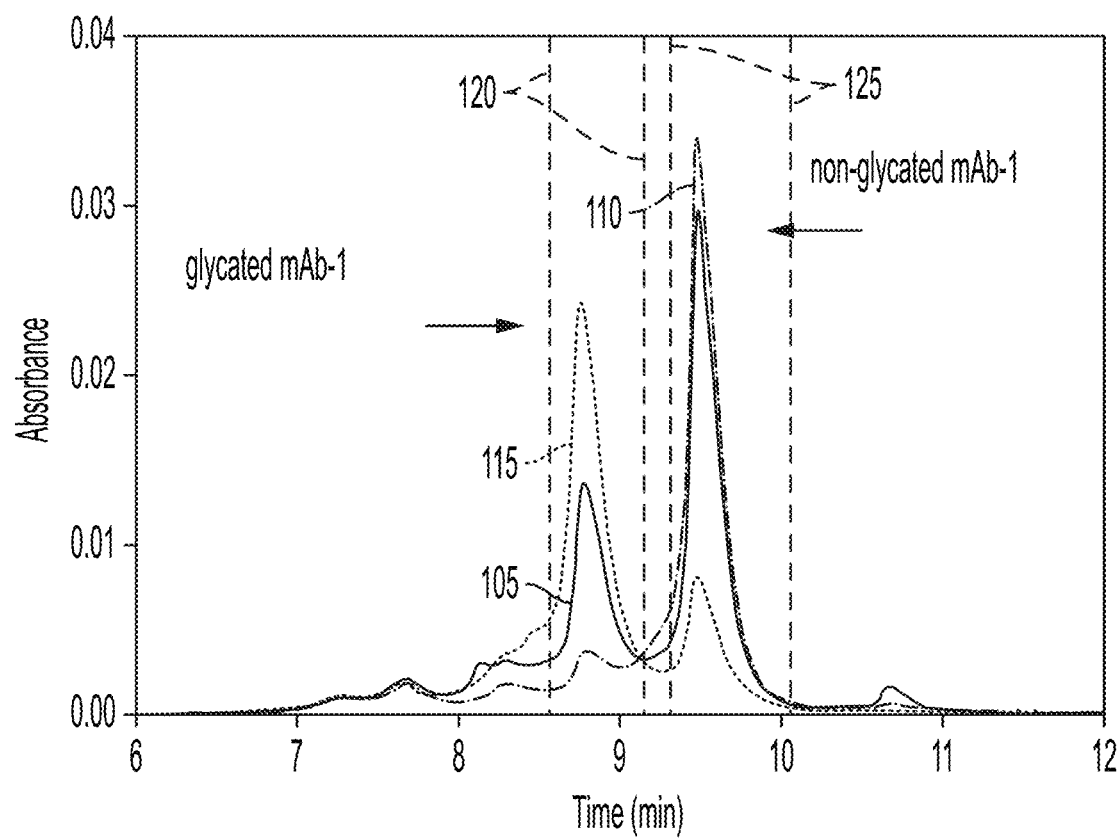
FIG. 1A illustrates charge variants of mAb-1 separated by cation exchange chromatography (CEX). Line 105: mAb-1 in 10 mM histidine pH 6.0 without treatment; Line 110: mAb-1 in 10 mM histidine pH 6.0 and incubated at 37° C. for 14 days; Line 115: mAb-1 in 10 mM histidine pH 6.0 with 0.1 M glucose and incubated at 37° C. for 14 days. Glycated mAb-1 elutes between two dashed lines 120 (8.6 and 9.1 min). Non-glycated mAb-1 elutes between two dashed lines 125 (9.3 and 10.1 min).

CEX was used to separate mAb-1 charge variants. Two major species eluted at 8.9 and 9.5 minutes and a number of minor species eluted earlier than 8.6 minutes and later than 10 minutes (FIG. 1A). The fractions of these two major species in neat mAb-1, eluting at 8.9 and 9.5 minutes, were approximately 27% and 47% of the total peak area, respectively. After incubating mAb-1 in 10 mM histidine, pH 6.0 and at 37° C. for 14 days, the relative amount of the species eluting at 8.9 minutes decreased and the relative amount of the species eluting at 9.5 minutes increased by approximately the same amount (refer to line 110, FIG. 1A), suggesting an ongoing reaction within the protein leading to the interconversion of the species eluting at 8.9 and 9.5 minutes, which may reflect the difference on their surface charge.

To understand the chemical nature of these two mAb-1 charge variants, they were purified from CEX followed by LC-MS peptide mapping analysis to identify and quantify the post-translational modifications (PTMs) in these two variants. This analysis revealed a mass shift of +162.7 Da at HC-CDR3-Lys98 in the species eluting at 8.9 minutes but not in the species eluting at 9.5 minutes. This mass shift was assigned as glycation at HC-CDR3-Lys98. Further analysis indicated that the levels of glycation in the species eluting at 8.9 minutes and 9.5 minutes species were 88% and 1%, respectively. No other PTMs were identified that differed significantly within these two species. Similarly, in the other heavy chain (HC*) CDR3, there is a lysine at position 98 (known as HC*-CDR3-Ly98) with no detectable level of glycation.

Figure 1B:
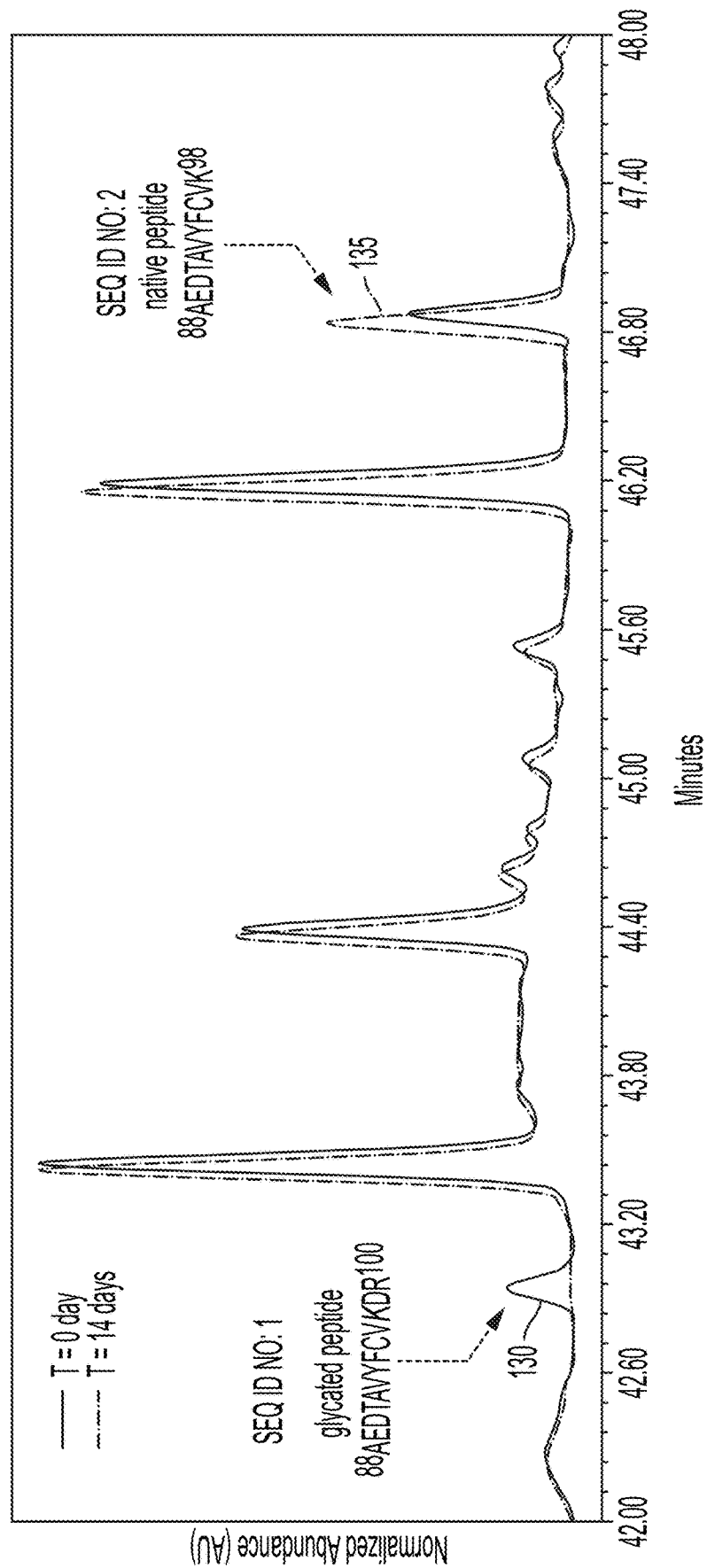
FIG. 1B depicts ultraviolet (UV) chromatograms of peptide maps of the control (neat) mAb-1 (line 130) and the mAb-1 incubated for at 37° C. for 14 days (line 135) in the absence of glucose. Buffer conditions were as follows.

LC-MS based peptide mapping analysis of neat mAb-1 (refer to line 130 at FIG. 1B) and mAb-1 following incubation at 37° C. for 14 days (refer to line 135 at FIG. 1B) in absence of glucose revealed a decrease of the glycated HC-CDR3-Lys98 peptide peak and a concomitant increase of the native (i.e. non-glycated) HC-CDR3-Lys98 peptide peak in the 37° C. incubated mAb-1 (FIG. 1B), consistent with the CEX results. The levels of glycation in neat mAb-1 (line 130) and mAb-1 following incubation at 37° C. (line 135) in absence of glucose were 32.0% and 2.0%, respectively, confirming the reversible nature of this reaction and the consistency of glycation levels quantified by CEX and LC-MS (typically differing by 5%).

To investigate if this glycation was driven by glucose, mAb-1 was incubated with 0.1 M glucose at 37° C. for 14 days. An increase in the HC-CDR3-Lys98 glycated species with a concomitant decrease in the non-glycated species was observed (refer to line 115, FIG. 1A). Similarly, the level of glycation increased as determined by LC-MS peptide mapping (data not shown). Together, the CEX and LC-MS analyses indicated that the glycation reaction is reversible and that the level of glycation is dependent on the presence of glucose in solution.

Example 2. Degree of Glycation at HC-CDR3-Lys98 Correlates to Drug Potency

To determine whether the glycation at HC-CDR3-Lys98 interferes with biological activity, glycated and non-glycated forms of mAb-1 purified by semi-preparative CEX chromatography, were mixed at various ratios to generate mAb-1 samples with glycation level ranging from 1 to 88% (determined by LC-MS based peptide mapping) and subjected to a cell-based potency assay. The results indicated a linear and inverse correlation between the level of glycation at HC-CDR3-Lys98 and the potency with a higher level of glycation at HC-CDR3-Lys98 being associated with a lower level of drug potency (FIG. 2). In addition, the binding affinity to the corresponding antigen, as measured by Biacore, indicated that mAb-1 with 88% glycation has approximately two-fold decrease in association rates compared to mAb-1 with 1% glycation, resulting in about two-fold decrease in binding affinity (data not shown). This is consistent with the cell based potency results. Mutating this HC-CDR3-Lys98 to arginine reduced the binding affinity by over 20 fold (data not shown). Together, these results suggested that the HC-CDR3-Lys98 is critical for mAb-1 binding to the antigen and its glycation can compromise the binding affinity.

Example 3. HC-CDR3-Lys98 Glycation Reaction Depends on the Concentration of Glucose in Solution To understand the impact of glucose on the glycation at HC-CDR3-Lys98, 6.9 μM mAb-1 (~1 mg/mL) was incubated with different concentrations of glucose from 0.3 to 111 mM at 37° C. for 28 days. The level of glycation in mAb-1 at the start of incubation was approximately 27% at HC-CDR3-Lys98. During the course of incubation, the level of glycation at HC-CDR3-Lys98 slowly decreased when solutions contained 3 mM glucose. At higher glucose concentration 6 mM, the free glucose binds covalently to the non-glycated HC-CDR3-Lys98, increasing the level of glycation over time until reaching the equilibrium (FIG. 3A).

The kinetics of glycation were analyzed with the first order models (Equation 5 and 6) by resolving three fitting parameters—the apparent rate constant, $k_{app}$, and amplitude, A, and the baseline, b, for each solution condition (Table 1), where the level of glycation at equilibrium was determined from A+b for glycation reaction, and from b for de-glycation reaction. A thermodynamic model (Equation 9), based on a simple chemical reaction: P+G↔PG (G: free glucose; P: non-glycated mAb-1; PG: glycated mAb-1, Scheme 2 in Example 8), was used to directly fit the equilibrium level of glycation at various glucose concentrations (FIG. 3B), returning the best fit of association constant K is 112 (±40) $M^{-1}$ (Table 2). Additionally, a kinetic model based on the same chemical reaction was applied to determine the glycation ($k_1$) and de-glycation ($k_{-1}$) rates (Equation 8). The global analysis of data from different glucose concentrations returned the best fit $k_1$=8.89 (±1.79) $M^{-1}$ $day^{-1}$ and $k_{-1}$=0.09 (±0.02) $day^{-1}$. The association constant, K, calculated from $k_1$ and $k_{-1}$ is 99 $M^{-1}$, statistically identical to the K obtained from thermodynamic analysis. The dissociation constant ($K_D$=1/K) of this reaction is approximately 8-10 mM, suggesting the level of glycation at HC-CDR3-Lys98 will be dependent on the actual glucose concentration in the cell culture medium at any given time, typically ranging from 5 to 55 mM. Hence, to produce mAb-1 with a consistent charge variants profile, it is important to maintain a consistent level of glucose during the cell culture process.

TABLE 1

Apparent kinetics of mAb-1 de-glycation in different solution conditions

| Buffer type | Buffer pH | [Glucose] (M) | Reaction temperature (° C.) | [mAb-1] (M) | $k_{app}$ $(day^{-1})^a$ | Amp $(\%)^b$ |
|---|---|---|---|---|---|---|
| HEPES | 7.4 | 0.1 | 37 | $6.9 \times 10^{-6}$ | NA | 57 (±6) |
| HEPES | 7.4 | 0.06 | 37 | $6.9 \times 10^{-6}$ | 0.93 (±0.16) | 53 (±5) |
| HEPES | 7.4 | 0.03 | 37 | $6.9 \times 10^{-6}$ | 0.33 (±0.04) | 42 (±2) |
| HEPES | 7.4 | 0.01 | 37 | $6.9 \times 10^{-6}$ | 0.27 (±0.03) | 19 (±1) |
| HEPES | 7.4 | 0.006 | 37 | $6.9 \times 10^{-6}$ | 0.14 (±0.10) | 5 (±1) |
| HEPES | 7.4 | 0.003 | 37 | $6.9 \times 10^{-6}$ | 0.17 (±0.03) | 7 (±1) |
| HEPES | 7.4 | 0.0006 | 37 | $6.9 \times 10^{-6}$ | 0.13 (±0.01) | 22 (±1) |
| HEPES | 7.4 | 0.0003 | 37 | $6.9 \times 10^{-6}$ | 0.08 (±0.01) | 25 (±1) |
| HEPES | 7.4 | 0 | 37 | $6.9 \times 10^{-6}$ | 0.10 (±0.01) | 29 (±1) |
| Histidine | 6.0 | 0 | 45 | $1.4 \times 10^{-5}$ | 0.18 (±0.03) | 26 (±2) |
| Histidine | 6.0 | 0 | 40 | $1.4 \times 10^{-5}$ | 0.075 (±0.010) | 26 (±1) |
| Histidine | 6.0 | 0 | 35 | $1.4 \times 10^{-5}$ | 0.058 (±0.008) | 27 (±1) |
| Histidine | 6.0 | 0 | 30 | $1.4 \times 10^{-5}$ | 0.035 (±0.005) | 28 (±1) |
| Histidine | 6.0 | 0 | 20 | $1.4 \times 10^{-5}$ | 0.009 (±0.001) | 27 (±1) |
| Histidine | 5.5 | 0 | 45 | $1.4 \times 10^{-5}$ | 0.14 (±0.02) | 26 (±2) |
| Histidine | 5.5 | 0 | 40 | $1.4 \times 10^{-5}$ | 0.062 (±0.008) | 26 (±1) |
| Histidine | 5.5 | 0 | 35 | $1.4 \times 10^{-5}$ | 0.047 (±0.006) | 27 (±1) |
| Histidine | 5.5 | 0 | 30 | $1.4 \times 10^{-5}$ | 0.027 (±0.004) | 27 (±1) |
| Histidine | 5.5 | 0 | 20 | $1.4 \times 10^{-5}$ | 0.006 (±0.001) | 27 (±1) |
| Histidine | 5.0 | 0 | 45 | $1.4 \times 10^{-5}$ | 0.085 (±0.013) | 25 (±1) |
| Histidine | 5.0 | 0 | 40 | $1.4 \times 10^{-5}$ | 0.036 (±0.005) | 26 (±1) |
| Histidine | 5.0 | 0 | 35 | $1.4 \times 10^{-5}$ | 0.028 (±0.004) | 27 (±1) |
| Histidine | 5.0 | 0 | 30 | $1.4 \times 10^{-5}$ | 0.016 (±0.003) | 27 (±1) |
| Histidine | 5.0 | 0 | 20 | $1.4 \times 10^{-5}$ | 0.003 (±0.001) | 27 (±1) |

[a] The apparent rate constant, $k_{app}$, was determined from either the first order glycation (Equation 5) or de-glycation reaction (Equation 6).
[b] The amplitude, Amp, was determined from either the first order glycation (Equation 5) or de-glycation reaction (Equation 6).

TABLE 2

Thermodynamic parameters for mAb-1 de-glycation in different solution conditions

| Buffer type | Buffer pH | Reaction temperature (° C.) | [mAb-1] (M) | K $(M^{-1})^a$ | $\Delta G$ $(kcal/mol)^b$ |
|---|---|---|---|---|---|
| HEPES | 7.4 | 37 | $6.9 \times 10^{-6}$ | 112 (±40) | −2.91 (−3.10, −2.64) |
| Histidine | 6.0 | 45 | $6.9 \times 10^{-6}$ | 16 (±7) | −1.75 (−1.98, −1.39) |
| Histidine | 6.0 | 37 | $6.9 \times 10^{-6}$ | 23 (±9) | −1.93 (−2.14, −1.63) |

TABLE 2-continued

Thermodynamic parameters for mAb-1 de-glycation in different solution conditions

| Buffer type | Buffer pH | Reaction temperature (° C.) | [mAb-1] (M) | K (M$^{-1}$)$^a$ | ΔG (kcal/mol)$^b$ |
|---|---|---|---|---|---|
| Histidine | 6.0 | 30 | 6.9 × 10$^{-6}$ | 25 (±8) | −1.94 (−2.11, −1.71) |
| Histidine | 6.0 | 25 | 6.9 × 10$^{-6}$ | 26 (±9) | −1.93 (−2.11, −1.68) |
| Histidine | 6.0 | 15 | 6.9 × 10$^{-6}$ | 32 (±16) | −1.98 (−2.22, −1.59) |

$^a$The apparent association constant, K, was determined from the 1:1 binding model (Equation 9).
$^b$The ΔG for glycation reaction is calculated from ΔG = −RT ln K$_{app}$, where R is the gas constant and T is the absolute temperature in Kelvin for the experiment.

Example 4. HC-CDR3-Lys98 De-Glycation Kinetics Depend on the Temperature and pH in Solution and Follow Arrhenius Behavior The impact of temperature on the de-glycation kinetics was examined by incubating 13.8 µM mAb-1 in solutions without glucose (10 mM histidine, 0.05% polysorbate 20, and 292 mM sucrose) and at temperatures ranging from 20 to 45° C., for up to 35 days. The initial mAb-1 was approximately 27% glycated at HC-CDR3-Lys98. At all temperatures tested, mAb-1 underwent de-glycation over time. This reaction is specific to the reducing sugar as the presence of an excess amount of non-reducing sugar, sucrose, does not impact the level of glycation. Another critical factor that impacts the glycation kinetics is pH. Indeed, at same incubation temperatures and without glucose, the apparent de-glycation is faster at pH 6.0 than at pH 5.0 (FIGS. 4A-4C).

A first order kinetic model was used to determine the de-glycation rates in order to understand the temperature dependence of mAb-1 de-glycation (Table 1). In all three pH conditions (pH 5.0, pH 5.5, and pH 6.0), the natural log of the apparent rate constants decreased linearly with decreasing temperature, suggesting the de-glycation kinetics follow Arrhenius behavior in the range of 20 to 45° C. (FIG. 4D). Using the Arrhenius equation (Equation 7), the apparent activation energy, E$_a$, was calculated to be 23.5 (±2.1), 23.1 (±1.8), and 21.4 (±1.7) kcal/mol, at pH 5.0, 5.5, and 6.0, respectively. The lower E$_a$ at higher pH suggests the energy barrier of de-glycation is lower as a faster reaction rates was observed at higher pH. This is consistent with the pH-dependent reaction rate.

Next, Arrhenius behavior was extrapolated to determine de-glycation rates at 5° C. The de-glycation rate constants at 5° C., determined by extrapolation, are 0.0011, 0.0007, and 0.0004 day$^{-1}$ at pH 6.0, 5.5, and 5.0, respectively. These rates allow the simulation of the de-glycation profiles using Equation 6, where A$_2$ was fixed at the level of glycation at t=0 and k$_{app}$ was fixed at the extrapolated de-glycation rate (0.0011, 0.0007, and 0.0004 day$^{-1}$ at pH 6.0, 5.5, and 5.0, respectively), at 5.0° C. As shown in FIG. 4E, the simulated profiles and real time de-glycation data at 5° C. are in agreement for at least 36 months, indicating that the de-glycation kinetics 1) follow Arrhenius behavior even at lower temperatures (e.g., 5° C.), and 2) can be well predicted from the short-term incubation experiments at higher temperatures.

Example 5. pH-Dependency of the Glycation Equilibrium Indicates a Low pK$_a$ of the Amine on HC-CDR3-Lys98 Side Chain To understand the pH-dependence of glycation, 6.9 µM mAb-1 was incubated in different buffers with pH ranging from 5 to 8 and with glucose concentrations varying from 3 to 11 mM, until the glycation reached the equilibrium. The equilibrium level of glycation was determined using the apparent first order kinetic models and plotted as a function of pH (FIGS. 5A-5C). At a constant pH (e.g. pH 7.0), a higher equilibrium level of glycation was observed at the higher glucose concentrations, consistent with previous results. At constant glucose concentrations, the level of glycation increased non-linearly with increasing pH. The buffer components did not have an apparent effect on the level of glycation of mAb-1 (FIGS. 5A-5C).

A simple equilibrium model was applied to quantitatively analyze the pH-dependent glycation. This model constitutes two reactions: the de-protonation of the amine on HC-CDR3-Lys98 side chain and the binding of glucose to the de-protonated amine, as shown below, $$PH^+ \rightleftarrows P + H^+$$

$$P + G \rightleftarrows PG \qquad \text{Scheme 1}$$

where PH$^+$ and P are mAb-1 with the protonated and de-protonated amine on HC-CDR3-Lys98 side chain, respectively, G is free glucose, H$^+$ is free proton, PG is mAb-1 glycated at HC-CDR3-Lys98, K$_1$ is the equilibrium constant for the de-protonation reaction, and K$_2$ is the equilibrium constant for the glycation reaction.

The overall observed fraction of glycated mAb-1 (% glycation) can be written:

$$\% \text{ glycation} = \left(\frac{[PG]}{[P_t]}\right) \cdot 100 \qquad \text{Equation 1}$$

where [PG] is the concentration of glycated mAb-1 and [P$_t$] is the concentration of total mAb-1. According to mass conservation in Scheme 1, [P$_t$] is the sum of [P], [PH$^+$], and [PG], where [P] is the concentration of de-protonated mAb-1 and [PH$^+$] is the concentration of protonated mAb-1.

Hence, Equation 1 can be expressed as, $$\% \text{ glycation} = \left(\frac{[PG]}{[P] + [PH^+] + [PG]}\right) \cdot 100 = \left(\frac{K_2[P][G]}{[P] + \left(\frac{[P][H^+]}{K_1}\right) + K_2[P][G]}\right) \cdot 100 \qquad \text{Equation 2}$$

followed by the rearrangement to obtain Equation 3, $$\% \text{ glycation} = \left(\frac{K_1 K_2 [G]}{[H^+] + K_1 + K_1 K_2 [G]}\right) \cdot 100 \qquad \text{Equation 3}$$

where [G] and [H$^+$] are the concentrations of free glucose and free protons in solution, respectively. The p$K_a$ of the ε-amine group of HC-CDR3-Lys98 can be determined from p$K_a$=−log ($K_1$), and $K_2$ is a pH-independent, microscopic association constant for the glycation reaction.

Equation 3 was used to globally fit three equilibrium data sets shown in FIGS. 5A-5C. In the non-linear least square (NLLS) analysis, [H$^+$] was determined from the measured pH; [G] was implicitly solved over the range of 0<[G]<[G$_t$] ([G$_t$] is the total glucose concentration determined from the added and bound glucose concentrations) with [P$_r$] fixed at 6.9 μM for each condition. This analysis returned the best-fit global parameters $K_1$=2.03 (±0.76)×10$^{-7}$ M, and $K_2$=120 (±26) M$^{-1}$, by which the p$K_a$ of the ε-amino group of HC-CDR3-Lys98 was estimated to be 6.7 (6.6, 6.9). This p$K_a$ is lower than the typical lysine ε-amino p$K_a$ value (10.4) in water.

Example 6. Thermodynamic Analysis Indicates that the Glycation Reaction is Enthalpically Driven To understand the driving force of the glycation reaction, the apparent association constant, K, of the glucose binding to HC-CDR3-Lys98 was measured by incubating 6.9 μM mAb-1 with different concentrations of glucose and at temperatures ranging from 15 to 45° C. The equilibrium level of glycation was determined for each condition, followed by NLLS analysis was then performed to determine K at each temperature (FIGS. 6A-6E and Table 2). K slightly decreases with increasing temperature, suggesting the reaction is not driven by the change of entropy. Using Van't Hoff analysis (plotting Ln (K) against 1/T) (FIG. 7) changes in enthalpy (ΔH=−4.0 (±0.8) kcal/mol) and entropy (ΔS=−0.007 (±0.003) kcal/mol·K) were determined, indicating that the glycation at HC-CDR3-Lys98 is predominantly driven by enthalpy. The small and negative entropy change suggested that the overall microenvironment may be more constrained upon glycation. Table 3 below illustrates a summary of kinetic and thermodynamic information from Scheme 1, 2, and Van't Hoff analysis for the mAb-1 glycation reaction at 37° C.

$$1.36z(pK_{a,ref} - pK_a) = \frac{332 \cdot Z^2}{2r_{cav}}\left(\frac{1}{\varepsilon_{app}} - \frac{1}{\varepsilon_{H_2O}e^{\kappa r_H}}\right) + \frac{332 \cdot Z^2}{2r_H}\left(\frac{1}{\varepsilon_{H_2O}e^{\kappa r_H}} - \frac{1}{\varepsilon_{app}}\right)$$

Equation 4 where z is the charge number of the lysine side chain, p$K_{a,ref}$ is the reference p$K_a$ for lysine in water, Z is the valence of the transferred ion, $r_{cav}$ is the cavity radius of the ionizable part of lysine, $r_H$ is the hydrodynamic radius of mAb-1, $\varepsilon_{H2O}$ is the dielectric constant of water, and K is the inverse Debye length of mAb-1. This method assumes the self-energetic difference between the charged lysine in water and in HC-CDR3-Lys98 local environment is the sole contributor to the shift of p$K_a$. Using the following parameters, p$K_{a,ref}$=10.4, Z=1, $r_{cav}$=2 Å, $r_H$=49 Å, $\varepsilon_{H2O}$=74.2 (at 37° C.), and κ=8.7E-4 (1/Å), the estimated apparent dielectric constant, $\varepsilon_{pp}$, is 13.0 which is substantially lower than the corresponding dielectric property in water, indicating that the local environment of HC-CDR3-Lys98 is less hydrated.

To understand the local environment of HC-CDR3-Lys98, a homology model was built by constructing one HC and light chain (LC) heterodimer at a time (FIGS. 8A and 8B). The predicted mAb-1 structures suggested the side chain of HC-CDR3-Lys98 is in a non-polar environment, surrounded by the aromatic rings of Tyr32, Phe27, and Tyr106 (FIG. 8A), and the aliphatic side chain of Val2. In contrast, the HC*-CDR3-Lys98 is in a more polar environment, where the side chain is facing the hydroxyl group of Tyr32 and Tyr109, and in close proximity to the carboxyl group of the side chain of Asp112, which can potentially form an ionic bond, stabilizing the local environment of HC*-CDR3-Lys98 (FIG. 8C). A molecular dynamics (MD) simulation was performed for docking a glucose to HC-CDR3-Lys98 (FIG. 8B). The AG for this interaction was estimated to be −2.8 kcal/mol, which is in excellent agreement with the experimental data (Table 2). Together, the results from in silico analyses are consistent with thermodynamic measurements, suggesting that HC-CDR3-Lys98 is in a less hydrated and less ionizable microenvironment.

TABLE 3

Summary of kinetic and thermodynamic information for the mAb-1 glycation reaction at 37° C.

| | Kinetic and thermodynamic analysis from Scheme 2 | | | Thermodynamic analysis from Scheme 1 | | Van't Hoff Analysis | |
|---|---|---|---|---|---|---|---|
| Kinetic and thermodynamic information | $k_1$ (M$^{-1}$ day$^{-1}$) | $k_{-1}$ (M$^{-1}$) | K$^{\#}$ (M$^{-1}$) | $K_1$ (M) | $K_2$ (M$^{-1}$) | ΔH (kcal/mol) | ΔS (kcal/mol · K) |
| Best fit parameters | 8.89 (±1.79) | 0.09 (±0.02) | 112 (±40) | 2.03 (±0.76) × 10$^{-7}$ | 120 (±26) | −4.0 (±0.8) | −0.007 (±0.003) |

$^{\#}$K is determined from Equation 9.

Example 7. Structural Analysis Suggests the HC-CDR3-Lys98 is Surrounded by a Less Polar Environment Lysines with lowered p$K_a$ values are typically found buried inside the protein or surrounded in a less polar environment. The shift of p$K_a$ may be used to calculate the apparent dielectric constant, $\varepsilon_{app}$, using Born formalism:

Example 8. HC-CDR3-Lys98 De-Glycation In Vivo Predicted from In Vivo Analysis A change in the level of HC-CDR3-Lys98 glycation was investigated in a non-human primate. A single dose (0.5 mg/kg) of mAb-1 was administered to a monkey followed by the collections of monkey serum samples at various time points (pre-dose, 5-minute, 5-hour, 1-day, 3-day, 7-day, 14-day, 28-day, and 42-day). Using LC-MS/MS to characterize mAb-1 in these serum samples, it was revealed that the in vivo levels of glycation decreased from 34.4% in the 5-minutes post-administration sample to 23.7% in the 42-day post-administration sample (FIG. 9A). The serum glucose concentrations were also measured, which fluctuated around 100 mg/dL (i.e. 5.6 mM, FIG. 9B). At this concentration range of glucose, it was expected that the level of glycation would slightly decrease over time before reaching an equilibrium. Indeed, after 14 days post-administration, the level of HC-CDR3-Lys98 glycation was stable at around 25%, indicating the in vivo level of HC-CDR3-Lys98 glycation was driven by the glucose concentrations in serum.

To compare the in vitro and in vivo kinetics, a prediction profile was generated using parameters determined in vitro. The level of glycation was simulated using Equation 6 with b fixed at the equilibrium level of glycation (24.0%), $A_2$ fixed at the difference between the levels of glycation at equilibrium and pre-dose (10.5%), and $k_{app}$ fixed at 0.14 (day$^{-1}$) as shown in Table 1. This predicted glycation profile was in excellent agreement with the in vivo level of glycation measured by LC-MS/MS, suggesting the mechanism of glycation/de-glycation determined in vitro and in silico was not impacted by the environment in vivo (refer to line corresponding to predicted levels of glycation at FIG. 9A).

FIGS. 10A-12B depict additional raw in vivo data from monkeys similar to that discussed above with regard to FIGS. 9A-9B. Specifically, test antibodies capable of being glycated at HC-Lys-98 were diluted with 0.9% saline with 0.05% polysorbate 80, then intravenously infused into monkeys. Table 4 below illustrates the sample information.

For the data pertaining to FIGS. 10A-12B, the monkeys had blood glucose levels between about 3-7 mM. The level of glycation in circulating mAbs reached a steady state at 20-30% at around 15 days, and this level of glycation remained stable for at least another 25 days when the mAbs were monitored in the monkeys. Based on the in vivo monkey data and typical human glucose concentration range (e.g., 4-7 mM), it may be expected that a mAb that is administered with a level of glycation in a range of 20-35% (e.g., level of 20-35% maintained during storage and handling) may undergo little to no changes in the level of glycation of the circulating antibody.

Materials and Methods Related to Preceding Examples

General Material Details

A monoclonal, IgG4-based, bi-specific antibody also referred as mAb-1, was manufactured by Regeneron Pharmaceuticals, Tarrytown NY and used throughout these studies. mAb-1 has two different heavy chains termed HC and HC*, respectively. Concentrated stock mAb-1 solution was stored frozen before use. All other chemicals used are of analytical grade.

General Experimental Details

All reactions were carried out in type-1 glass vials and sealed with elastomeric stoppers and aluminum seals with a plastic flip-off cap and stored in temperature-controlled incubators. Four different buffer agents were used for different pH ranges: Acetate for pH 5.0-5.5, Histidine for pH 5.0-6.5, HEPES for pH 6.5-8.0, and Phosphate for pH 6.0-8.0. All protein samples were prepared by directly mixing stock solutions of mAb-1 with other buffer components. The pH of each protein sample was monitored during the incubation to ensure no pH shift occurred. Protein concentrations were determined by the UV absorption at 280 nm using an extinction coefficient of $9.97 \times 10^{-6}$ M$^{-1}$·cm$^{-1}$.

HC-CDR3-Lys98 Glycation Analysis and Sample Preparation

TABLE 4

Sample information for in vivo studies

| Study Day | Post Time Dose (h) | Test mAb A 0.5 mg/kg (Group 6) | | | Test mAb B 0.5 mg/kg (Group 7) | | | Test mAb B 1.0 mg/kg (Group 8) | | |
|---|---|---|---|---|---|---|---|---|---|---|
| | | I11947 M | I11948 M | I11949 M | I11950 M | I11951 M (μg/mL) | I11952 M | I11953 M | I11954 M | I11955 M |
| D1 | 0 | BLQ | BLQ | BLQ | BLQ | BLQ | BLQ | BLQ | BLQ | BLQ |
| D1 | 5 MIN (0.083 H) | 17.4 | 12.2 | 14.6 | 17.0 | 12.8 | 12.7 | 28.8 | 27.2 | 26.3 |
| D1 | 5 | 14.6 | 10.1 | 11.1 | 12.7 | 10.6 | 10.3 | 24.4 | 23.6 | 21.1 |
| D2 | 24 | 9.12 | 7.38 | 6.80 | 8.20 | 7.43 | 7.55 | 19.0 | 18.2 | 15.2 |
| D3 | 48 | 7.85 | 5.34 | 6.0 | 6.70 | 5.64 | 5.31 | 11.9 | 13.3 | 12.8 |
| D4 | 72 | 5.97 | 4.61 | 5.03 | 5.59 | 4.78 | 4.36 | 11.8 | 11.0 | 10.4 |
| D6 | 120 | 5.32 | 4.02 | 4.36 | 4.87 | 3.42 | 3.74 | 9.21 | 9.39 | 9.15 |
| D8 | 168 | 4.68 | 3.66 | 3.82 | 4.28 | 2.92 | 3.16 | 7.99 | 8.03 | 8.03 |
| D11 | 240 | 4.34 | 2.86 | 2.84 | 3.74 | 2.31 | 2.59 | 7.35 | 6.50 | 6.99 |
| D15 | 336 | 3.48 | 1.96 | 2.15 | 3.08 | 1.56 | 2.12 | 5.77 | 4.99 | 5.49 |
| D19 | 432 | 3.00 | 1.35 | 1.54 | 2.68 | 1.23 | 1.73 | 4.56 | 4.31 | 4.78 |
| D22 | 504 | 2.56 | 1.13 | 1.34 | 2.18 | 0.883 | 1.36 | 3.79 | 3.32 | 3.89 |
| D25 | 576 | 1.86 | 0.731 | 0.927 | 2.15 | 0.799 | 1.19 | 3.22 | 3.20 | 3.33 |
| D29 | 672 | 1.53 | 0.504 | 0.708 | 1.69 | 0.532 | 0.891 | 2.44 | 2.30 | 2.51 |
| D33 | 768 | 1.20 | 0.351 | 0.528 | 1.33 | 0.434 | 0.742 | 1.96 | 1.84 | 2.05 |
| D36 | 840 | 1.04 | 0.253 | 0.397 | 1.09 | 0.317 | 0.577 | 1.68 | 1.42 | 1.65 |
| D39 | 912 | 0.854 | 0.166 | 0.351 | 0.988 | 0.264 | 0.521 | 1.41 | 1.27 | 1.41 |
| D43 | 1008 | 0.749 | 0.110 | 0.282 | 0.741 | 0.194 | 0.380 | 1.21 | 0.951 | 1.12 |

Samples labeled in bold above at Table 4 were selected for HC-Lys98 glycation quantitation. The data is depicted at FIGS. 10A-12B. Specifically, FIG. 10A, FIG. 11A, and FIG. 12A depict HC-Lys98 glycation percent plotted along with mAb concentration, and FIG. 9B, FIG. 10B, and FIG. 11B depict HC-Lys98 glycation percent plotted along with measured glucose concentration (mg/d L).

The glycation reaction at the side chain of HC-CDR3-Lys98 was measured by two methods, CEX and LC-MS peptide mapping.

CEX: The CEX method was run on a Waters Acquity UPLC system with a YMC-BioPro SP-F column controlled at 25° C. 10 to 50 µg of mAb-1 was loaded to the CEX column in the binding buffer: 50 mM MES, pH 6.5 with 20 mM NaCl, and eluted with a linear concentration gradient of 0.5 mM NaCl/min from 20 to 150 mM NaCl, in a 0.5 mL/min flow rate. The elution was monitored at a wavelength of 280 nm and the chromatogram was processed by Empower 3 data software, where the relative fraction of each charge variant was calculated from the total area of the chromatogram.

LC-MS peptide mapping: mAb-1 samples were denatured and reduced with 5 mM Tris(2-carboxyethyl)phosphine hydrochloride (TCEP-HCl) at 80° C. for 10 min. The reduced cysteine residues were alkylated with 5 mM iodoacetamide at room temperature for 30 minutes in the dark. The urea concentration was diluted to 1.25M before digestion. Trypsin (Promega, Sunnyvale, CA) or Endoproteinase Asp-N(New England Biolabs, Ipswich, MA) was added with a 1:20 enzyme: substrate ratio and incubated at 37° C. for 4 hours. Digestion was terminated by adding 20% trifluoroacetic acid (TFA; Thermo Scientific, San Jose, CA). The digested samples were stored at −80° C. until analysis. The digested samples were loaded and separated using an Acquity UPLC BEH C18 column (Waters, Milford, MA) on a Waters Acquity UPLC system, coupled to a Q Exactive plus mass spectrometer (Thermo Fisher Scientific, San Jose, CA). The mobile phase A was 0.05% TFA in water and mobile phase B was 0.1% TFA in acetonitrile. A gradient from 0.1% mobile phase B to 35% mobile phase B for 75 min at a flow rate of 0.25 mL/min was used for peptide separation. The MS acquisition consisted of a full mass scan followed by tandem mass (MS/MS) scans of the top 5 most intense ions of each full scan. The peptide identification was determined by Proteome Discover 1.4 (version 1.4.0.288, Thermo Fisher Scientific, San Jose, CA) and verified manually. The peptide quantification was determined by integration of the extracted peptide ion peaks using Skyline daily (MacCoss Lab, Depatment of Genome Science, UVV) with a mass window of 5 ppm.

Sample Preparation of mAb-1 with Different Levels of Glycation at HC-CDR3-Lys98 mAb-1 with different levels of glycation at HC-CDR3-Lys98 were purified by CEX method. Fully glycated mAb-1 was purified by collecting and pooling fractions that eluted between 8.6 and 9.1 min on CEX. Similarly, non-glycated mAb-1 was purified by collecting fractions that eluted between 9.3 and 10.1 min on CEX. The purified glycated and non-glycated forms of mAb-1 were each dialyzed against 10 mM histidine, pH 6.0. LC-MS analysis confirmed the level of glycation at HC-CDR3-Lys98. The glycated and non-glycated species were mixed at different ratios to create mAb-1 solutions with varying percentages of glycation at HC-CDR3-Lys98.

In Vitro Bioassay of mAb-1 Activity

Serial dilutions of mAb-1 were added in triplicate to the first target cells (Jurkat/NFAT-Luc, 10,000 cells/well), in the presence of the second target cells (OVCAR-3 cells, 10,000 cells/well). The antibody dilutions and bioassay were performed in Jurkat complete media (RPMI medium 1640 supplemented with 10% FBS, and 1× Penicillin-Streptomycin L-glutamine). Wells containing no antibody were used as a control. Plates were incubated at 37° C., 5% CO2 for 4-6 hours and then brought to room temperature for 15 minutes. One-Glo luciferase substrate (100 µL) was added to each well, and the plates were incubated for 3-5 minutes. The luminescence signal was measured using a Perkin Elmer Victor X5 plate reader, and measured values were analyzed by a four parameter logistic equation over an 11-point response curve using GraphPad Prism.

Kinetic and Thermodynamic Analysis

The apparent kinetic analysis was performed using the following two models:

Glycation reaction (i.e. the increase of the percent of glycated HC-CDR3-Lys98 over time)

$$\% \text{ glycation} = A_1(1-e^{(-k_{app} \cdot t)}) + b \qquad \text{Equation 5}$$

De-glycation reaction (i.e. the decrease in the percent of glycated HC-CDR3-Lys98 over time)

$$\% \text{ glycation} = A_2 \cdot e^{(-k_{app,2} \cdot t)} + b \qquad \text{Equation 6}$$

where $A_1$ and $A_2$ are the amplitudes, $k_{app,1}$ and $k_{app,2}$ are the apparent reaction rate constants, t is the time, and b is the baseline.

In the data-fitting procedure, t was fixed as the independent parameter and $A_1$, $A_2$, $k_{app,2}$, and b were allowed to vary in order to find the best fit values. For conditions without glucose, b was fixed at 0 to avoid over parameterization. For a glycation reaction, the equilibrium level of glycation (i.e. plateau) can be determined from the sum of $A_1$ and b. For a de-glycation reaction, the equilibrium level of glycation is determined from b.

The Arrhenius equation was applied to calculate the apparent activation energy, $E_a$, from de-glycation kinetics at different temperatures, $$Ln(k_{app,2}) = Ln(A) - \frac{E_a}{RT} \qquad \text{Equation 7}$$

where A is a constant, R is the gas constant, and T is the absolute temperature in Kelvin. The linear relationship between $Ln(k_{app,2})$ and $1/T$ indicates that the reaction follows Arrhenius behavior, where $E_a$ can determined from the slope.

For a more detailed kinetic analysis, the reaction between glucose and mAb-1 can be expressed as follows:

$$P + G \underset{k_{-1}}{\overset{k_1}{\rightleftharpoons}} \text{PG} \qquad \text{Scheme 2}$$

where P is the non-glycated mAb-1, G is glucose, PG is the glycated mAb-1, and $k_1$ and $k_{-1}$ are the association and dissociation rate constants, respectively. In the condition where the initial concentration of free glucose, $[G_0]$, is much larger than the initial concentration of non-glycated mAb-1, $[P_0]$, a kinetic description of the percent of glycation at time, t, can be described as follows:

$$\% \text{ glycation} = \qquad \text{Equation 8}$$
$$\left(\frac{k_1[G_0]}{k_1[G_0] + k_{-1}}\left(1 - e^{-(k_1[G_0]+k_{-1})t}\right) + e^{-(k_1[G_0]+k_{-1})t} \cdot \frac{[PG_0]}{[P_t]}\right) \cdot 100$$

where $[P_t]$ is the total protein concentration of mAb-1 and $[PG_0]$ is the initial protein concentration of the glycated mAb-1. In the data-fitting procedure, $[G_0]$, $[PG_0]$, and $[P_t]$ were fixed while $k_1$ and $k_{-1}$ were allowed to vary in order to find the best fit values.

Based on Scheme 2, an equilibrium description of the percent of glycation can be described as follows:

$$\% \text{ glycation} = \left(\frac{K[P_e][G_e]}{[P_e] + K[P_e][G_e]}\right) \cdot 100 \qquad \text{Equation 9}$$

where $[G_e]$ and $[P_e]$ are the concentrations of free glucose and non-glycated mAb-1, respectively, at equilibrium. In the data-fitting procedure, $[G_e]$ and $[P_e]$ were implicitly solved over the range of $0<[G]<[G_t]$, and $0<[P]<[P_t]$, where $[G_t]$ and $[P_t]$ are the total concentrations of glucose and mAb-1, respectively, and K was allowed to vary to determine the best fit value.

Structure Modeling for mAb-1

Predicted structure models for mAb-1 were generated using the Molecular Operating Environment (MOE—Chemical Computing Group, Montreal, Canada). An database of antibody structures was used to generate the homology model for individual dimers of heavy and light chains. The Fab domains were built by grafting the appropriate framework and loop templates followed by energy minimization. Docking experiments were performed by modeling the covalent interaction between the ε-amino group of lysine side chain and the aldehyde group of glucose, where the local environment was refined by an induced fit mechanism.

Calculation of Uncertainties in Non-Linear Least Square Analysis

During the data-fitting procedure, all equations were programmed in Scientist Software (Micromath, St. Louis, MO). The best fit parameters were determined from the NLLS analysis with uncertainties reported in parenthesis. For symmetric errors, the uncertainties were reported as ±error under 95% confidence intervals. For asymmetric error, the uncertainties were reported as (lower limit, upper limit) under 95% confidence intervals.

Preclinical Sample Information

The preclinical serum samples were obtained from single dose cynomolgus monkey pharmacokinetics (PK) studies. mAb-1 was administered to subjects intravenously (IV). The cynomolgus monkey was dosed at 0.5 mg/kg, and serum samples were collected at designated time points (pre-dose, 5-minute, 5-hour, 1-day, 3-day, 7-day, 14-day, 28-day, and 42-day). The serum samples were stored at −80° C. until analyses. The mAb-1 serum concentration at each collected time-point was measured using an enzyme-linked immunosorbent assay (ELISA). In brief, the mAb-1 was captured on a microtiter plate coated with drug target. The mAb-1 captured on the plate was detected using biotinylated mouse anti-human IgG4 monoclonal antibody, followed by NeutrAvidin conjugated to horseradish peroxidase (NeutraAvidin-HRP). A luminol-based substrate specific for peroxidase was then added to achieve a signal intensity that is proportional to the concentration of mAb-1. The serum glucose levels were measured using a freestyle lite blood glucose monitoring system (Abbott Laboratories, Chicago, IL).

Affinity Purification of mAb-1 from Serum Samples mAb-1 was purified from the collected monkey serum samples by affinity purification. In brief, a biotinylated anti-human antibody was conjugated to Dynabeads MyOne Streptavidin T1 magnetic beads (Invitrogen, Carlsbad, CA) at room temperature for 10 minutes. The conjugated beads were then incubated with serum samples at room temperature for 30 minutes. The beads were washed with HBS-EP buffer (GE Healthcare, Pittsburgh, PA), and then eluted with 0.1% formic acid (FA) and 50% acetonitrile.

Tryptic Digestion

The purified mAb1 samples were dried down using a vacuum concentrator (LABCONCO, Kansas City, MO). The dried samples were re-suspended in 100 mM Tris-HCl containing 8 M urea and 10 mM Tris (2-carboxyethyl) phosphine hydrochloride (TCEP-HCl), and then incubated at 37° C. for 30 minutes. The reduced cysteine residues were alkylated with 10 mM iodoacetamide at room temperature for 30 minutes in the dark. Following alkylation, the urea concentration was diluted to 1.25 M prior to digestion. Trypsin (Promega, Sunnyvale, CA) was added the samples at an enzyme: substrate ratio of 1:10 and incubated at 37° C. for 4 hours. Digestion was terminated by addition of 20% formic acid. The digested samples were stored at −80° C. until analysis.

LC-MS/MS and Data Analysis

Peptides generated by trypsin digestion were separated using an Acquity UPLC CSH C18 1.7 μm, 2.1 mm×150 mm column (Waters, Milford, MA) on an Acquity I-Class UPLC system (Waters, Milford, MA) coupled to a Q Exactive Plus mass spectrometer (Thermo Fisher Scientific, San Jose, CA). Mobile phase A was 0.1% FA in water and mobile phase B was 0.1% FA in acetonitrile. A gradient increasing from 2% mobile phase B to 30% mobile phase B over 56 min at a flow rate of 0.25 mL/min was used for peptide separation. The MS acquisition consisted of a full mass scan followed by tandem mass (MS/MS) scans of the top 5 highest intensity ions from each full scan. Peptide and PTM identification were determined by Byonic (version 2.16.11, Protein Metrics Inc., San Carlos, CA) and verified manually. To quantify relative abundance of PTMs, the extracted ion chromatograms, based on the m/z of the first isotope peak of both the modified peptide and native peptide, were generated and the extracted peak areas were integrated using Skyline-daily (version 4.1.1.18151, MacCoss Lab, University of Washington, WA) using a mass window of 5 ppm. The percentage of each PTM variant was calculated using the extracted ion chromatogram (EIC) peak area of the modified peptide relative to the sum of the peak areas of the modified and native peptides.

BRIEF DISCUSSION OF THE PRECEDING EXAMPLES

During the cell culture process, glucose is an essential energy source for the growing cells. To maintain a high growth rate for cells, glucose is fed constantly into the bioreactor, where unconsumed glucose results in glycation of HC-CDR3-Lys98. The glucose concentration present in the reactor impacts the level of glycation. The kinetic analysis suggests that once mAb-1 is glycated, the de-glycation is relatively slow as compared to the glycation reaction. The net result is that during the purification process (without glucose present), the level of glycation tends to be constant and directly correlates with the level of glycation that was present in the bioreactor. Although the level of glycation remains relatively constant during purification, when mAb-1 is in a liquid formulation and stored at 5° C., the data shows that glycated mAb-1 undergoes a consistent and measurable rate of de-glycation. It was demonstrated that producing mAb-1 in a lyophilized formulation, essentially stopped the de-glycation reaction presumably by removing the water required for the hydrolysis.

The de-glycation reaction kinetics follow Arrhenius behavior in the temperature range from 5 to 45° C. (FIGS. 4A-4D). As a result, the data generated from the higher temperatures (20-45° C.) can be used in conjunction with an Arrhenius model to predict the de-glycation behavior at lower temperatures such as 5° C. The calculated activation energy from the Arrhenius equation indicates that the de-glycation is pH dependent with lower activation energy at higher pH. This suggests that the de-glycation rate is likely to be faster at higher pH. Experimental results confirmed this prediction and demonstrated that the apparent de-glycation rate constant, at 20° C., increased by 3 fold when pH of the solution was increased from 5.0 to 6.0 (Table 1). This observation was likely due to increased rate of the reverse reaction for the Amadori product (ketoamine) and a concomitant release of glucose from the Schiff base at higher pH.

Although the apparent de-glycation reaction was faster at higher pH, at steady state the equilibrium level of glycation for mAb-1 was greater at higher pH (FIGS. 5A-5C), suggesting the glycated lysine is more stable at higher pH. Additionally, data showed that the presence of histidine and phosphate/carbonate ions does not promote the overall glycation reaction. This was unexpected because there is evidence that indicates the histidine and phosphate/carbonate ions facilitate the Amadori rearrangement. An alternate hypothesis that could explain the behavior is that the glycation at HC-CDR3-Lys98 was not driven by stabilizing the Schiff base intermediate or an Amadori product, but rather by lowering the $pK_a$ at HC-CDR3-Lys98. When the equilibrium data at different pH values were analyzed globally using a simple de-protonation model, a lower than normal $pK_a$ value of 6.7 for HC-CDR3-Lys98 was resolved. This $pK_a$ suggests that, at pH 7.4, 84% of HC-CDR3-Lys98 will be de-protonated. Analyzing the shift in $pK_a$ with a Born formalism returned an apparent dielectric constant of 13.0. While this value is slightly larger than the dielectric property observed inside the protein, it is significantly lower than the dielectric constant of water, implying the microenvironment of HC-CDR3-Lys98 is less hydrated than what might be expected at the surface of a protein. Additionally, the thermodynamic analysis suggests that the overall glycation reaction is favored by enthalpy and unfavored by entropy.

The results suggest the following glycation mechanism: upon glycation, there is a slight structural reorganization causing the local environment to be more constrained. During this reorganization process, the less hydrated nature of the microenvironment limits the extent of water rearrangement. Hence, the reaction is driven by the change of enthalpy.

Most examples of lysine ε-amino groups with a reduced $pK_a$ values are found buried inside proteins, serving, for example, enzymatic or energy transduction functions. However, HC-CDR3-Lys98 is on the surface and critical for the interaction with the antigen. In contrast, HC*-CDR3-Lys98 (the corresponding amino acid on the other CDR of this bi-specific antibody) is also exposed to the surface, and yet level of glycation was below the level of detection, which suggests the local environment at HC-CDR3-Lys98 facilitates the glycation. The simulated mAb-1 structure indicates the microenvironment of HC-CDR3-Lys98 is less polar than HC*-CDR3-Lys98, not only due to the surrounding amino acids but also due to the orientation of their side chains. Within 4.5 Å, HC-CDR3-Lys98 is surrounded by aromatic rings from amino acids neighboring in space. The closest polar group is the side chain of Tyr32, approximately 4.7 Å away; however, lysine and tyrosine are unlikely to form an ionic interaction. On the other hand, HC*-CDR3-Lys98 is facing towards the side chains of Asp112 and Tyr109 and can potentially form a salt bridge with the carboxyl group on Asp112 (only 1.8 Å away). Because of the nature of the local environment, it is possible that HC-CDR3-Lys98 may have more flexibility than HC*-CDR3-Lys98 prior to glycation. After glycation, the glucose-lysine adduct may undergo structural reorganization and become more constrained, as predicted by the negative entropy change.

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

---

What is claimed is:

1. A method for maintaining a glycation percentage of an amino acid in a biomolecule within a predetermined glycation percentage range over a shelf-life of the biomolecule, comprising:
    incubating the biomolecule having a first glycation percentage in a plurality of different glucose concentrations, and measuring the glycation percentage over time for each of the plurality of different glucose concentrations;
    determining a glycation equilibrium percentage for the biomolecule as a function of each of the plurality of different glucose concentrations based on the measuring of the glycation percentage over time;
    identifying the glycation equilibrium percentage and a corresponding glucose concentration that results in the first glycation percentage being maintained within the predetermined glycation percentage range; and
    incubating the biomolecule with the corresponding glucose concentration over the shelf-life of the biomolecule.

2. The method of claim 1, further comprising determining a potency level of the biomolecule as a function of glycation percentage of the amino acid.

3. The method of claim 1, wherein the biomolecule is an antibody.

4. The method of claim 3, wherein the amino acid is located within:
    (a) a variable region that impacts antigen binding;
    (b) a complementarity determining region (CDR);
    (c) a CDR located within the heavy chain variable region; or
    (d) HCDR3.

5. The method of claim 1, wherein the biomolcule is an antibody.

6. The method of claim 5, wherein the amino acid is located within:
    (a) a variable region that impacts antigen binding;
    (b) a complementarity determining region (CDR);
    (c) a CDR located within the heavy chain variable region; or
    (d) HCDR3.

7. A method for reducing potency of a therapeutic biomolecule in a subject at time of administration, comprising:
    identifying a therapeutic biomolecule comprising one or more amino acid residues subject to glycation, wherein glycation of the one or more amino acid residues reduces potency of the therapeutic biomolecule; and
    formulating the therapeutic biomolecule with glucose at a concentration greater than 150 mg/dl, wherein glycation of the one or more amino acid residues is reduced and potency of the therapeutic biomolecule increases to an equilibrium determined by the subject's blood glucose concentration following administration of the therapeutic biomolecule to the subject.

8. The method of claim 7, wherein the glucose concentration is greater than 200 mg/dL.

9. The method of claim 7, wherein the reduced potency of the therapeutic biomolecule at the time of administration reduces the incidence of cytokine release syndrome or infusion related reactions.

10. The method of claim 7, wherein:
- (a) the therapeutic biomolecule is an antibody;
- (b) the one or more amino acids is located within a variable region that impacts antigen binding;
- (c) the one or more amino acids is located within a complementarity determining region (CDR);
- (d) the one or more amino acids is located within a CDR located within the heavy chain variable region; or
- (e) the one or more amino acids is located within HCDR3.

* * * * *

UNITED STATES PATENT AND TRADEMARK OFFICE
CERTIFICATE OF CORRECTION

PATENT NO. : 12,436,152 B2
APPLICATION NO. : 17/711817
DATED : October 7, 2025
INVENTOR(S) : Haibo Qiu et al.

It is certified that error appears in the above-identified patent and that said Letters Patent is hereby corrected as shown below:

In the Claims

Claim 5
Column 41, Line 35:
"claim 1"
Should read:
--claim 2--

Claim 5
Column 41, Line 35:
"biomolcule"
Should read:
--biomolecule--

Signed and Sealed this
Ninth Day of December, 2025

John A. Squires
*Director of the United States Patent and Trademark Office*